United States Patent
Koo

(10) Patent No.: US 9,860,035 B2
(45) Date of Patent: Jan. 2, 2018

(54) METHOD AND APPARATUS FOR DECODING MULTI-USER MULTIPLE-INPUT MULTIPLE OUTPUT WIRELESS SIGNAL

(71) Applicant: Samsung Electronics Co., Ltd., Suwon-si (KR)

(72) Inventor: Ji Hun Koo, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 76 days.

(21) Appl. No.: 15/164,244

(22) Filed: May 25, 2016

(65) Prior Publication Data
US 2017/0230150 A1    Aug. 10, 2017

(30) Foreign Application Priority Data
Feb. 5, 2016    (KR) .................. 10-2016-0014760

(51) Int. Cl.
| | |
|---|---|
| H04L 5/00 | (2006.01) |
| H04B 7/0452 | (2017.01) |
| H04B 7/04 | (2017.01) |
| H04L 27/36 | (2006.01) |
| H04W 84/12 | (2009.01) |

(52) U.S. Cl.
CPC ......... *H04L 5/0023* (2013.01); *H04B 7/0452* (2013.01); *H04B 7/0486* (2013.01); *H04L 27/362* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 8,160,182 B2* | 4/2012 | Chen | ................ H04L 25/03242 375/320 |
| 8,185,798 B2 | 5/2012 | Oteri et al. | |

(Continued)

OTHER PUBLICATIONS

Quentin H. Spencer et al., "Zero-Forcing Methods for Downlink Spatial Multiplexing in Multiuser MIMO Channels," IEEE Transactions on Signal Processing, Feb. 2004, pp. 461-471, vol. 52, Issue 2, IEEE.

(Continued)

*Primary Examiner* — Brian Roberts
(74) *Attorney, Agent, or Firm* — H.C. Park & Associates, PLC

(57) ABSTRACT

A method of an RFC chip for a station, the RFC chip including a WLAN communication module to decode a DL MU-MIMO wireless signal, the method including: determining an FS layer column based on a product of a channel matrix of the station and an estimate of a steering matrix of the station; ordering columns of a sub-matrix of an effective channel matrix of the station to determine one or more SS layer columns from the sub-matrix, the sub-matrix being determined by removing, from the effective channel matrix, a column corresponding to the determined FS layer column; configuring a modified effective channel matrix based on the determined FS layer column and the ordered columns of the sub-matrix, the determined FS layer column being determined as an FS layer column of the modified effective channel matrix; and determining a symbol of the station based on the modified effective channel matrix.

20 Claims, 17 Drawing Sheets

(56) References Cited

U.S. PATENT DOCUMENTS

| | | | |
|---|---|---|---|
| 8,503,544 | B2 | 8/2013 | Chockalingam et al. |
| 8,599,976 | B2 | 12/2013 | Gomadam et al. |
| 8,634,490 | B2 | 1/2014 | Chockalingam et al. |
| 8,804,858 | B2 | 8/2014 | Chockalingam et al. |
| 8,873,364 | B2 | 10/2014 | Kuchi et al. |
| 8,891,689 | B2 | 11/2014 | Uln |
| 8,982,979 | B2 | 3/2015 | Chavali et al. |
| 9,008,241 | B1 | 4/2015 | Tong |
| 9,066,247 | B2 | 6/2015 | Zhou et al. |
| 2010/0296554 | A1 | 11/2010 | Uln et al. |
| 2013/0251074 | A1* | 9/2013 | Uln ................. H04L 1/0054 375/341 |

OTHER PUBLICATIONS

Sung-Hyun Moon et al., "Channel Quantization for Block Diagonalization with Limited Feedback in Multiuser MIMO Downlink Channels," Journal of Communication and Networks, Feb. 2014, pp. 1-9, vol. 16, Issue 1, IEEE.

Jungwon Lee et al., "Interference Mitigation via Joint Detection," IEEE Journal on Selected Areas in Communications, Jun. 2011, pp. 1172-1184, vol. 29, Issue 6, IEEE.

Mohamed Oussama Damen et al., "A Generalized Sphere Decoder for Asymmetrical Space-Time Communication Architecture,"IEEE Electronics Letters, Jan. 20, 2000, pp. 166-167, vol. 36, Issue 2, IEEE.

Luis G. Barbero and John S. Thompson, "A Fixed Complexity MIMO Detector based on the Complex Sphere Decoder," IEEE 7th Workshop on Signal Processing Advances in Wireless Communications, Jul. 2-5, 2006, pp. 1-5, IEEE.

Joakim Jalden et al., "The Error Probability of the Fixed-Complexity Sphere Decoder," IEEE Transactions of Signal Processing, Jul. 2009, pp. 2711-2720, vol. 57, Issue 2, IEEE.

Andrew Myles and Rolf De Vegt, "Wi-Fi Alliance (WFA) VHT Study Group Usage Models," 11-07/2988r4, Mar. 9, 2008, https://mentor.ieee.org/802.11/dcn/07/11-07-2988-04-0000-liaison-from-wi-fi-alliance-to-802-11-regarding-wfa-vht-study-group-consolidation-of-usage-models.ppt.

Jihun Koo et al., "An Extendable Fixed-Complexity Sphere Decoder for Downlink Multi-User MIMO Communication System," The Journal of Korea Information and Communications Society, Apr. 11, 2014, pp. 180-187, vol. 39A, Issue 4, The Korean Institute of Communications and Information Sciences.

* cited by examiner constellation bit encoding for 256-QAM (1st quadrant)

constellation bit encoding for 256-QAM (2nd quadrant)

constellation bit encoding for 256-QAM (2rd quadrant)

constellation bit encoding for 256-QAM (4th quadrant)

(a) for $\hat{S}_1^i$ (b) for $\hat{S}_2^i$

METHOD AND APPARATUS FOR DECODING MULTI-USER MULTIPLE-INPUT MULTIPLE OUTPUT WIRELESS SIGNAL

CROSS REFERENCE TO RELATED APPLICATION

This application claims priority from and the benefit of Korean Patent Application No. 10-2016-0014760, filed on Feb. 5, 2016, which is hereby incorporated by reference for all purposes as if fully set forth herein.

BACKGROUND

Field

Exemplary embodiments relate to wireless communications, and, more particularly, to wireless communications in multi-user multiple-input multiple-output (MU-MIMO) environments.

DISCUSSION

The Institute of Electrical and Electronics Engineering (IEEE) 802.11ac standard governs aspects of wireless local area networking. For instance, the IEEE 802.11ac standard enables a maximum of 3.39 Gbit/s throughput for a single station (STA) with a 4×4 multiple-input multiple-output (MIMO) topology. The IEEE802.11ac standard also supports up to four simultaneous downlink (DL) MU-MIMO clients with an 8×8 antenna configuration. For example, four users can simultaneously use the same frequency channel without time division multiplexing. This provides for a total aggregate capacity of 6.9 Gbit/s.

With respect to DL MU-MIMO implementations of IEEE802.11ac, the explicit beamforming technology of IEEE 802.11n may be applied using a compressed feedback matrix. As such, system capacity may be improved by transmitting precoded signals to multiple STAs with the channel state information delivered from each STA. The precoded signals may be generated according to a channel inversion or block diagonalization (BD)-based technique. The signal-to-interference ratio (SIR) of each STA may, however, decrease due to imperfections in channel-estimation and quantization errors of the compressed feedback matrix. As such, STA receiver performance may decrease. To this end, increases in the MIMO dimension of the receiver (up to the number of interference signal streams) increasingly complicate the receiver implementation. Accordingly, it becomes concomitantly impractical to perform an optimal MIMO decoding algorithm, such as maximum-likelihood decoding (MLD) and sphere-decoding (SD). To overcome the impracticality, conventional approaches typically limit the number of interference signal streams at the expense of MIMO dimensioning. A wireless local area network (WLAN) is a wireless network that links two or more devices using a wireless distribution method, e.g., spread-spectrum or orthogonal frequency division multiplexing (OFDM) radio, within a limited area in comparison with a cellular mobile network. The WLAN refers to a wireless communication network based on Institute of Electrical and Electronics Engineers (IEEE) 802.11 standards, also known as Wi-Fi®.

The above information disclosed in this Background section is only for enhancement of understanding of the background of the inventive concept, and, therefore, it may contain information that does not form the prior art that is already known to a person of ordinary skill in the art.

SUMMARY

One or more exemplary embodiments provide a method and apparatus for decoding a signal in MU-MIMO environment.

According to one or more exemplary embodiments, a joint detection algorithm for MU-MIMO is proposed on the basis of channel extension and reconstruction for the entire interference signals.

Additional aspects will be set forth in the detailed description which follows, and, in part, will be apparent from the disclosure, or may be learned by practice of the inventive concept.

According to one or more exemplary embodiments, a method of a radio frequency communication (RFC) chip for a station, the RFC chip including a wireless local area network (WLAN) communication module to decode a downlink (DL) multi-user multiple-input multiple-output (MU-MIMO) wireless signal, the method including: determining a full search (FS) layer column based on a product of a channel matrix of the station and an estimate of a steering matrix of the station; ordering columns of a sub-matrix of an effective channel matrix of the station to determine one or more single search (SS) layer columns from the sub-matrix, the sub-matrix being determined by removing, from the effective channel matrix, a column corresponding to the determined FS layer column; configuring a modified effective channel matrix based on the determined FS layer column and the ordered columns of the sub-matrix, the determined FS layer column being determined as an FS layer column of the modified effective channel matrix; and determining a symbol of the station based on the modified effective channel matrix.

According to one or more exemplary embodiments, a radio frequency communication (RFC) chip for a station, the RFC chip including: a fixed-complexity sphere decoder (FSD) configured to decode a downlink (DL) multi-user multiple-input multiple-output (MU-MIMO) wireless signal associated with symbols for a plurality of stations. The FSD is configured to: determine a full search (FS) layer column based on a product of a channel matrix of the station and an estimate of a steering matrix of the station; order, based on a comparison associated with magnitudes of columns of an effective channel matrix of the station, the columns of the effective channel matrix of the station; generate a modified effective channel matrix by reordering the ordered columns of the effective channel matrix such that a column of the effective channel matrix corresponding to the determined FS layer column is reordered to be an FS layer column of the modified effective channel matrix; determine a full rank matrix based on the modified effective channel matrix; and determine a symbol of the station based on the full rank matrix.

According to one or more exemplary embodiments, a mobile station including: a display; a system-on-chip (SoC) including a processor configured to process instructions associated with an application program, a system memory configured to store data, and a graphic processing unit (GPU) configured to process graphic data to be displayed on the display of the mobile station; multiple antennas configured to receive a downlink (DL) multi-user multiple-input multiple-output (MU-MIMO) wireless signal associated with symbols for a plurality of stations; and a fixed-complexity sphere decoder (FSD) configured to decode the DL MU-MIMO wireless signal. The FSD is configured to: determine a full search (FS) layer column based on a product of a channel matrix of the mobile station and an estimate of a steering matrix of the mobile station; order, based on a comparison associated with magnitudes of columns of an effective channel matrix of the mobile station, the columns of the effective channel matrix of the mobile station; generate a modified effective channel matrix by reordering the ordered columns of the effective channel matrix such that a column of the effective channel matrix corresponding to the determined FS layer column is reordered to be an FS layer column of the modified effective channel matrix; determine a full rank matrix based on the modified effective channel matrix; and determine a symbol of the mobile station based on the full rank matrix.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
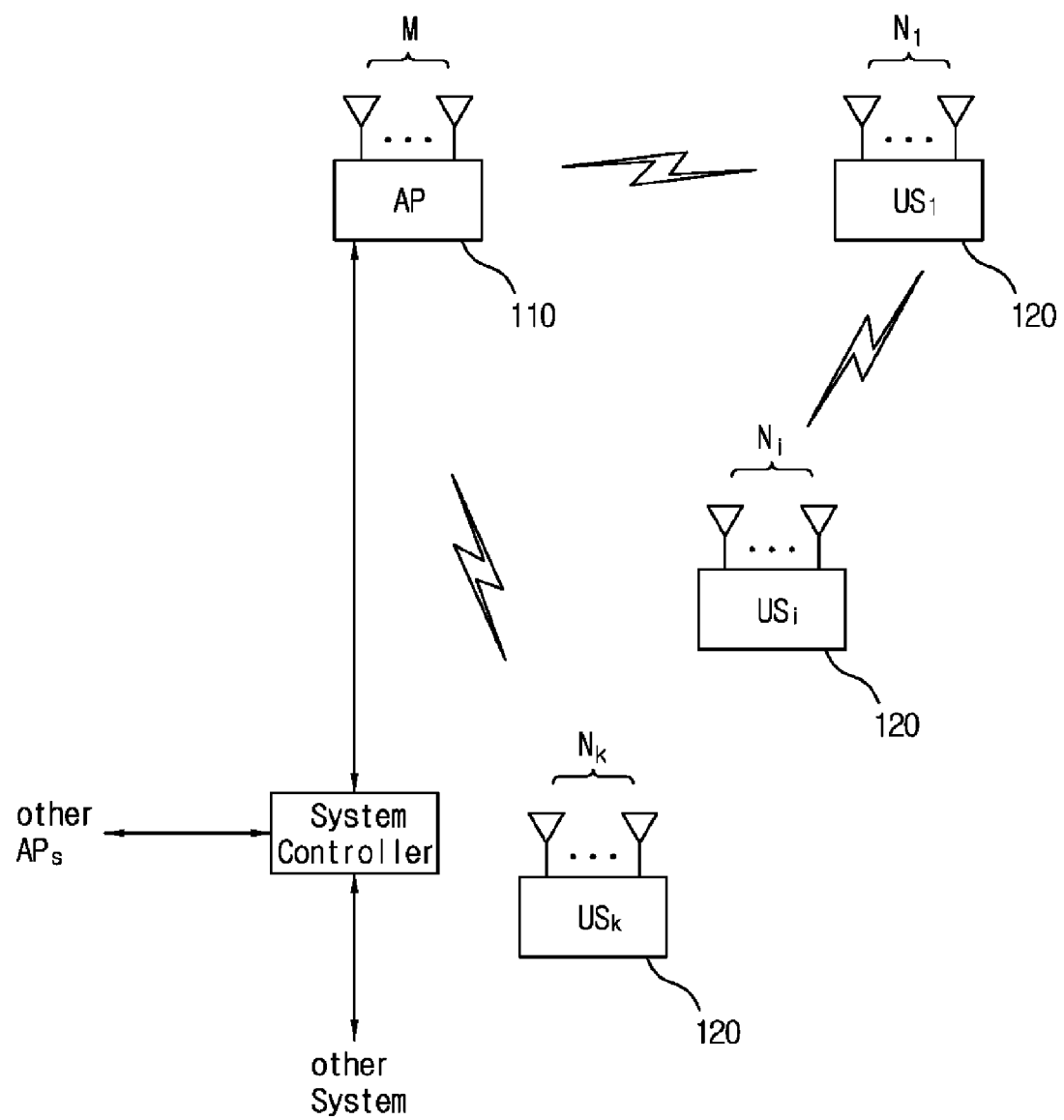
FIG. 1 is a block diagram of a multiple-input and multiple-output (MIMO) wireless communication system, according to one or more exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

Unless otherwise specified, the illustrated exemplary embodiments are to be understood as providing exemplary features of varying detail of various exemplary embodiments. Therefore, unless otherwise specified, the features, blocks, components, modules, elements, and/or aspects of the various illustrations may be otherwise combined, separated, interchanged, and/or rearranged without departing from the disclosed exemplary embodiments. Further, in the accompanying figures, the size and relative sizes of blocks, components, modules, elements, etc., may be exaggerated for clarity and descriptive purposes. Also, like reference numerals may denote like or similar elements.

When an element is referred to as being "connected to" or "coupled to" another element, it may be directly connected to or coupled to the other element or intervening elements or may be present. When, however, an element or layer is referred to as being "directly connected to" or "directly coupled to" another element, there are no intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms "first," "second," etc. may be used herein to describe various elements, blocks, components, regions, and/or sections, these elements, blocks, components, regions, and/or sections should not be limited by these terms. These terms are used to distinguish one element, block, component, region, and/or section from another element, block, component, region, and/or section. Thus, a first element, block, component, region, and/or section discussed below could be termed a second element, block, component, region, and/or section without departing from the teachings of the present disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a block diagram of a multiple-input and multiple-output (MIMO) wireless communication system, according to one or more exemplary embodiments.

Although FIG. 1 illustrates one access point (AP) 110, a plurality of APs may be configured in the MIMO wireless communication system 100. An AP is generally a fixed station that communicates with user stations and may also be referred to as a base station, or the like. A user station may be fixed or mobile and may also be referred to as a mobile station, a user terminal, a station, a client, a wireless device, or the like. The user station may be (or include) any suitable wireless device, such as a cellular phone, a smartphone, a personal digital assistant (PDA), a tablet personal computer (PC), a wireless modem, etc.

The AP 110 may communicate with one or more user stations 120 on the downlink (DL) and uplink (UL). The downlink is the communication link from an AP to one or more user stations, and the uplink is the communication link from one or more user stations to an AP, e.g., AP 110. A user station may also directly communicate with another user station. A system controller 130 may provide coordination and control for a plurality of APs including the AP 110.

The MIMO system 100 employs multiple transmit and multiple receive antennas for data transmission on the downlink and the uplink. The AP 110 may have a number M of antennas, which represents multiple-input for downlink transmissions and multiple-output for uplink transmissions. For MU-MIMO, single-user (SU)-MIMO, spatial division multiple access (SDMA), or the like, a set $\Sigma_{i=1}^{K} N_i$ of antennas of selected user stations 120 collectively represents the multiple-output for downlink transmissions and the multiple-input for uplink transmissions, where K is the number of selected user stations 120, and $N_i$ is the number of antennas of the i-th user station 120. According to one or more exemplary embodiments, it may be desirable to have $M \geq \Sigma_{i=1}^{K} N_i \geq 1$ if the data symbol streams for the selected K user stations 120 are not multiplexed in code, frequency, or time by a multiplexing configuration, e.g., code division multiple access (CDMA), orthogonal frequency division multiplexing (OFDM), time division multiple access (TDMA), and the like.

The MIMO system 100 may be a time division duplex (TDD) system or a frequency division duplex (FDD) system. In a TDD system, the downlink and uplink share the same frequency band. In an FDD system, the downlink and uplink use different frequency bands. Further, the MIMO system 100 may support protocols conforming to various Institute of Electrical and Electronics Engineers (IEEE) 802.11 standards, e.g., IEEE 802.11ac, IEEE 802.11n, etc.

Figure 2:
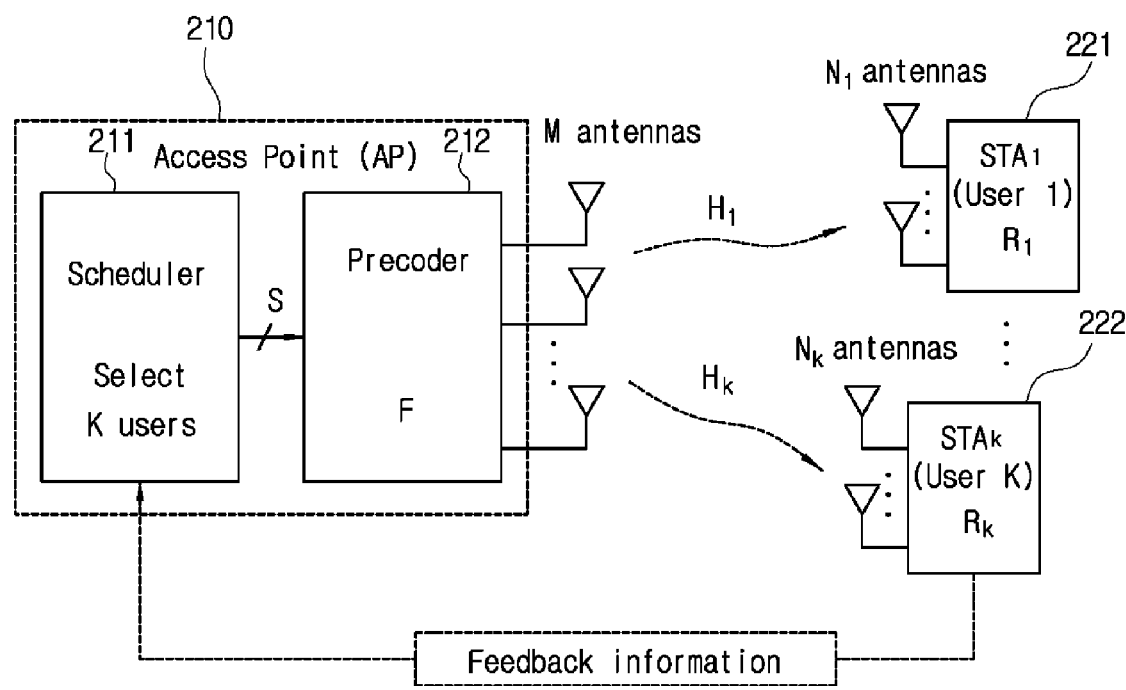
FIG. 2 is a block diagram of a MIMO wireless communication system, according to one or more exemplary embodiments.
Figure 3A:
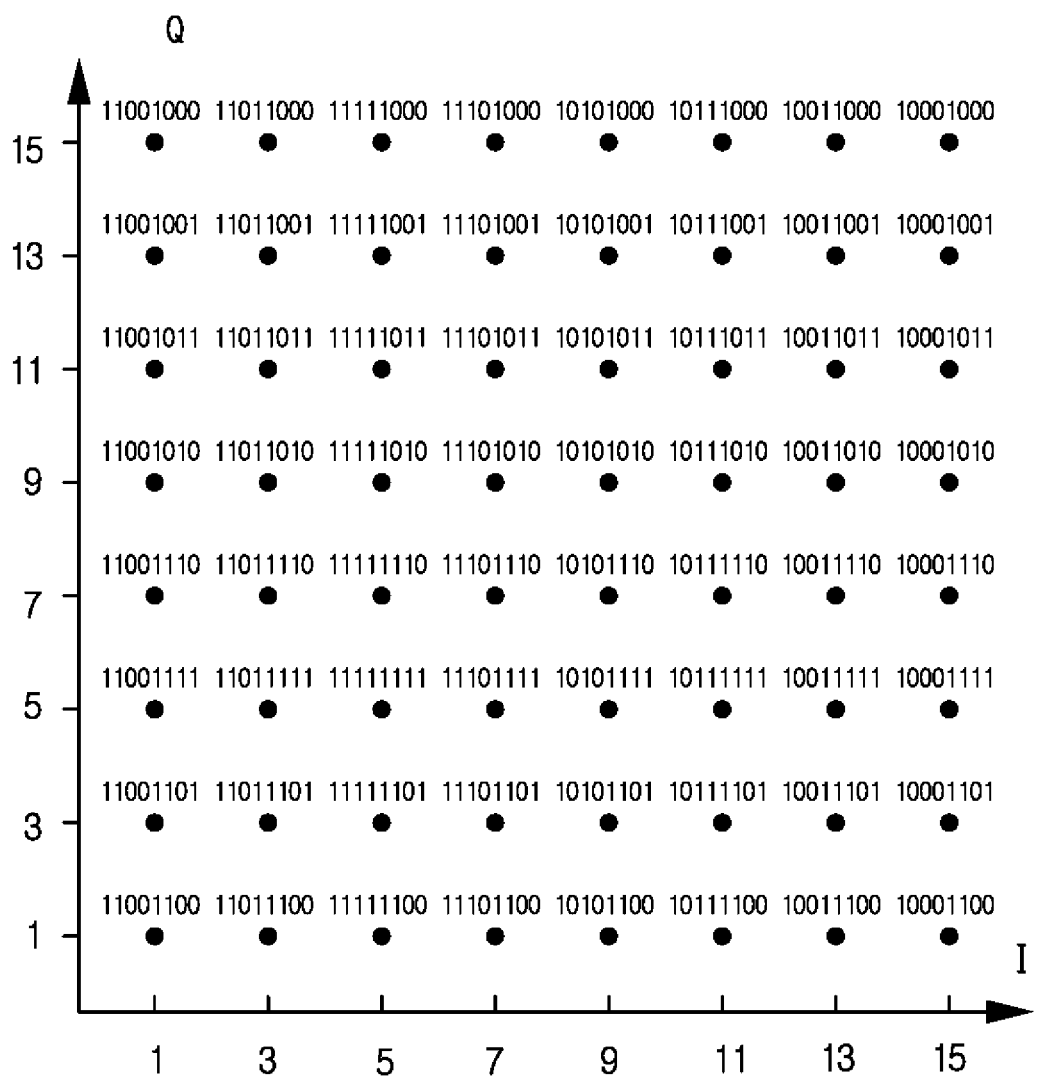
FIGS. 3A, 3B, 3C, and 3D are respective quadrant diagrams of constellation bit encoding for 256-quadrature amplitude modulation (QAM).
Figure 3B:
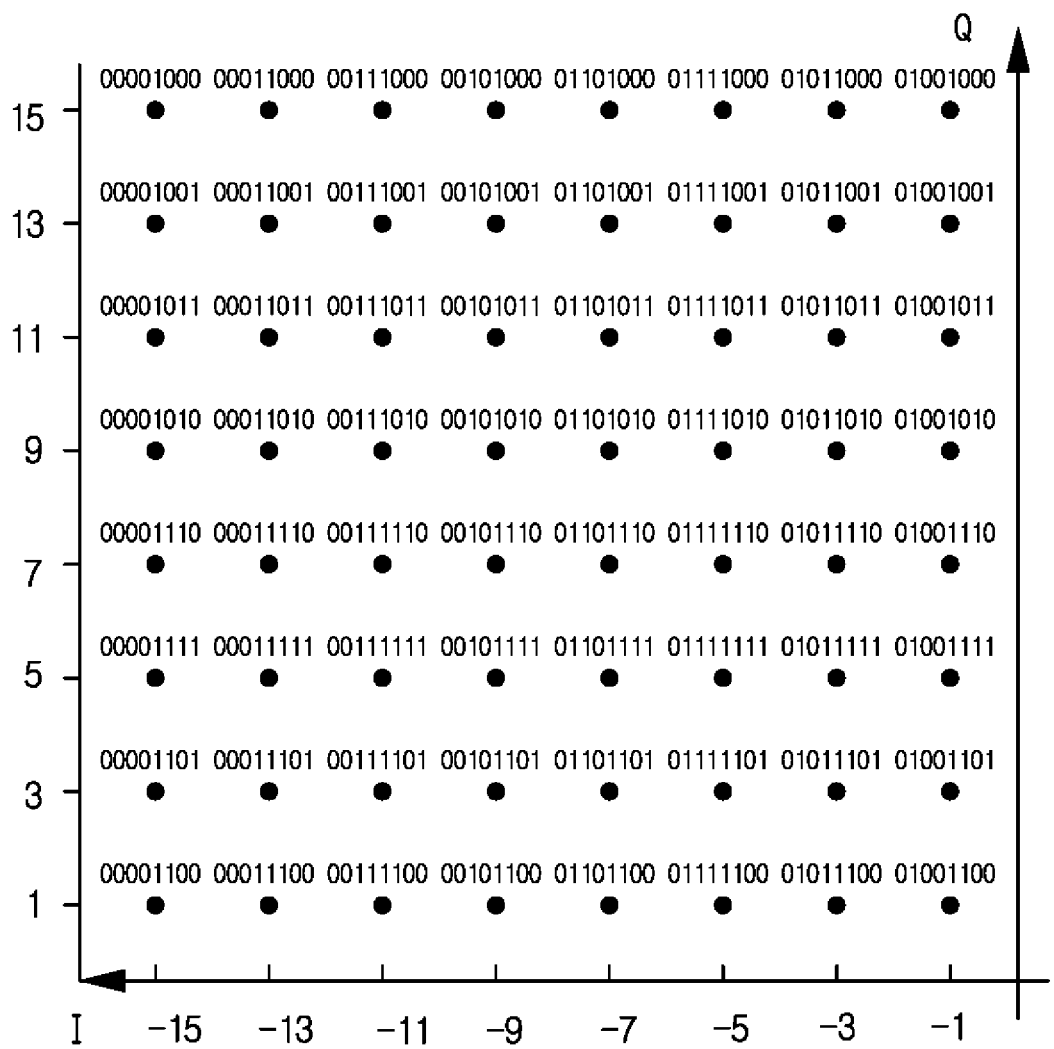
Figure 3C:
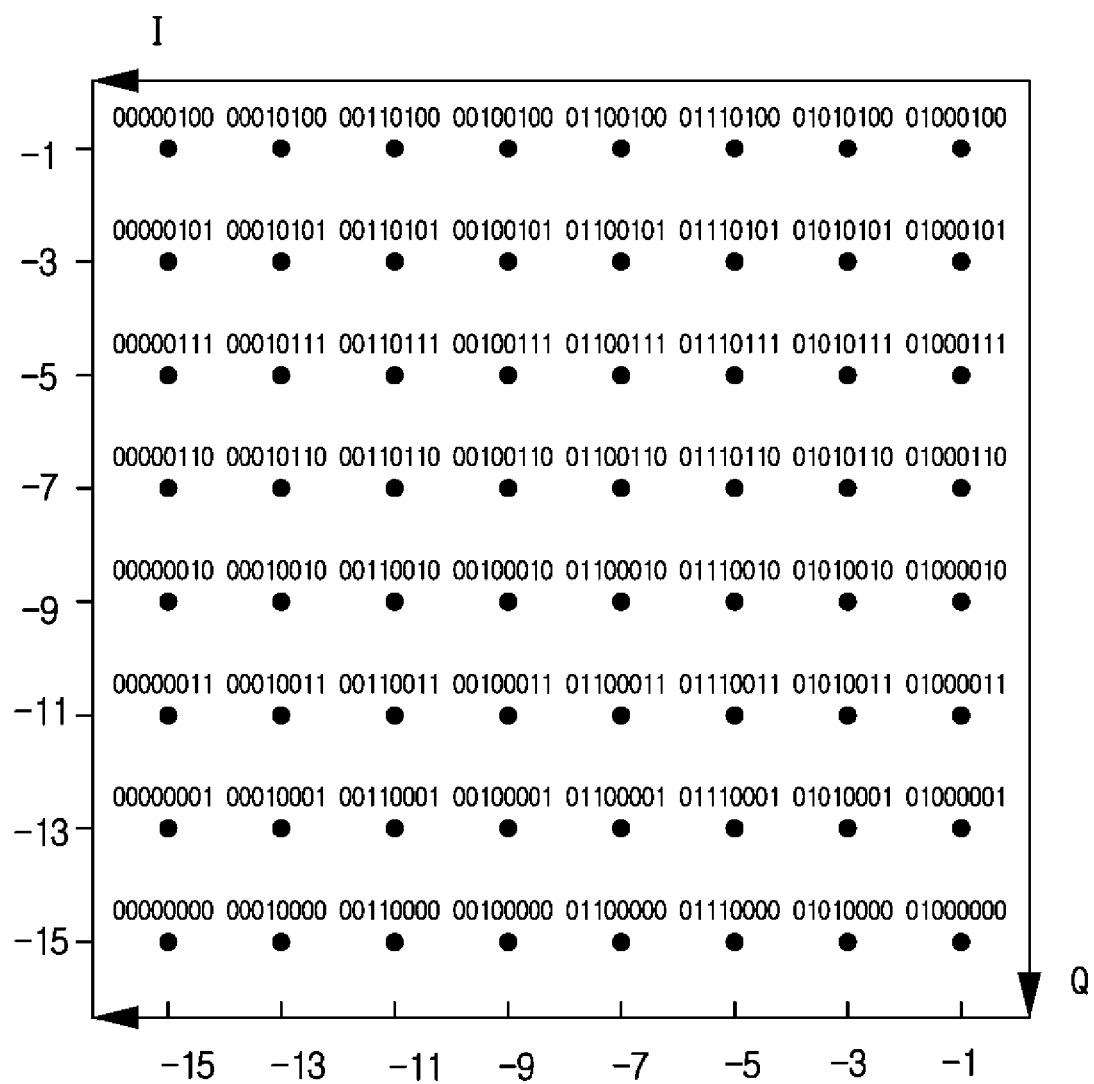
Figure 3D:
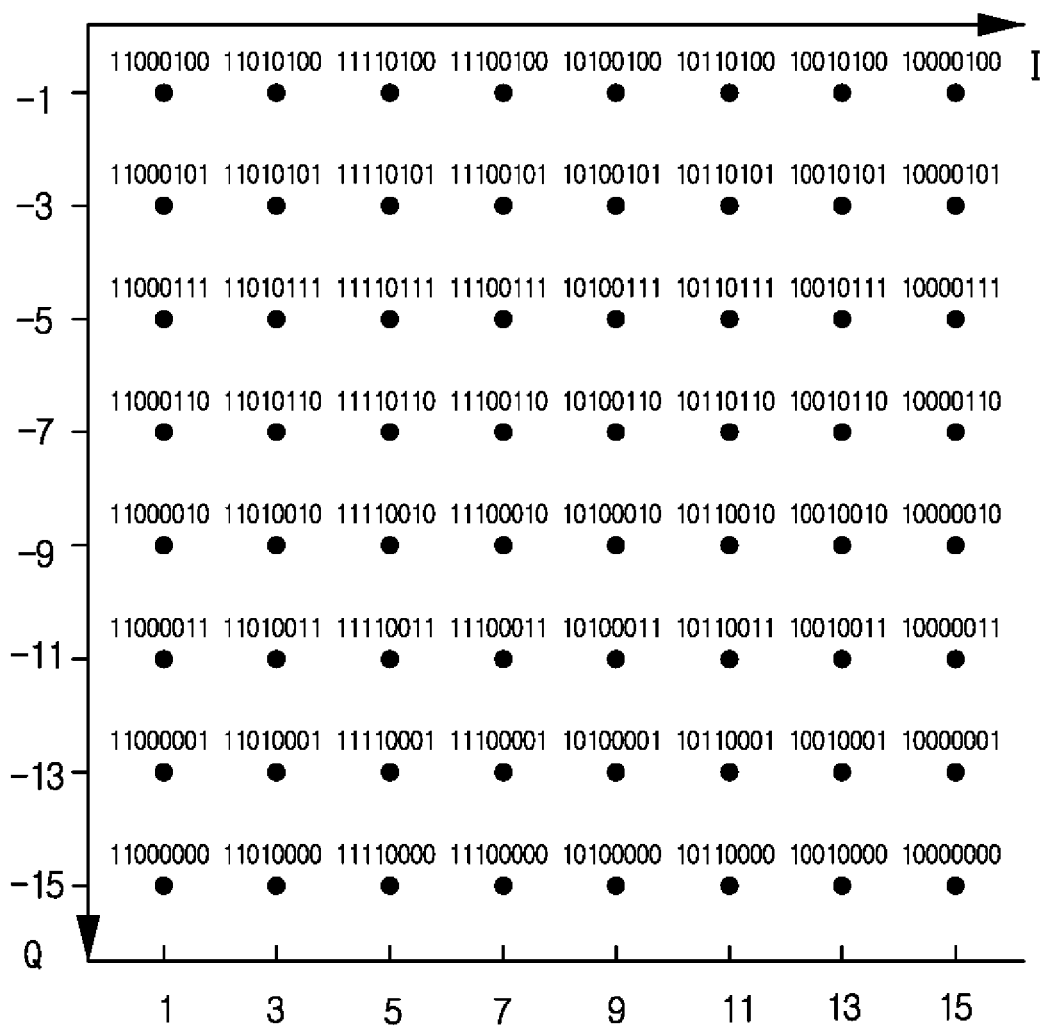

FIG. 2 is a block diagram of a MIMO wireless communication system, according to one or more exemplary embodiments.

Referring to FIG. 2, the MIMO system 200 includes an AP 210 supporting DL MU-MIMO and K selected user stations 221, 222. The user station (STA$_1$) 221 may have $N_1$ antennas, and the user station (STA$_k$) 222 may have $N_k$ antennas. The AP 210 may have M antennas. The AP 210 may estimate channels $H_1, \ldots, H_K$ to transmit data to the K selected user stations 221, 222. The AP 210 may receive channel state information from the selected user stations 221, 222 in response to the AP 210 transmitting a signal including data for channel estimation. Further, the AP 210 may multiply a precoding matrix of a precoder F 212 by a stream signal s and transmit a wireless signal generated based on the result (or product). The precoding matrix of the precoder F 212 may be referred to as a steering matrix.

System Model for Interference Mitigation

In general, the DL MU-MIMO model can be modeled as communications between an AP that employs M transmit antennas and K user stations, where the i-th user station (STA$_i$) includes $N_i$ receiving antennas (i=1, 2, ..., K). As such, the DL MU-MIMO may be used in various wireless communication environments, e.g., wireless communication environments conforming to IEEE 802.11ac, Long Term Evolution (LTE), LTE-Advanced (LTE-A), etc. For example, if K user stations have the same number of antennas N, then $N_i$=N for i=1, 2, ..., K. Further, according to one or more exemplary embodiments, $\Sigma_{i=1}^{K} N_i = M$. The received signal $y_i$ of the STA$_i$ may be represented as a linear combination of the transmitted data symbol vector s corrupted by additive Gaussian noise $v_i$, as designated in Equation 1.

$$y_i = H_i F s + v_i \qquad \text{Eq. 1}$$
$$= H_i F_i s_i + H_i F_{li} s_{li} + v_i$$

where $s_i$ is a desired signal of STA$_i$, $H_i$ is an $N_i \times M$ channel matrix of STA$_i$, and F is an $M \times \Sigma_{i=1}^{K} N_i$ steering matrix for beamforming, which may be referred to as a precoding matrix. Further, $v_i$ represents $N_i \times 1$ complex Gaussian noise, e.g., additive white Gaussian noise (AWGN), with $E[v_i^T v_i] = \sigma^2 I_{N_i}$. In this manner, $\sigma$ is the standard deviation of the Gaussian noise, and $I_{N_i}$ is an $N_i \times N_i$ identity matrix $$H_i = \begin{bmatrix} h_{11}^i & \cdots & h_{1M}^i \\ \vdots & \ddots & \vdots \\ h_{N_i 1}^i & \cdots & h_{N_i M}^i \end{bmatrix}, \quad F_i = \begin{bmatrix} f_{11}^i & \cdots & f_{1N_i}^i \\ \vdots & \ddots & \vdots \\ f_{M1}^i & \cdots & f_{MN_i}^i \end{bmatrix},$$

which is a steering matrix of STA$_i$, $$s_i = \begin{bmatrix} s_1^i \\ \vdots \\ s_{N_i}^i \end{bmatrix}, \quad v_i = \begin{bmatrix} v_1^i \\ \vdots \\ v_{N_i}^i \end{bmatrix},$$

$$s^T = [s_1^T \ \ldots \ s_{i-1}^T \ s_i^T \ s_{i+1}^T \ \ldots \ s_K^T],$$

and $F = [F_1 \ \ldots \ F_{i-1} \ F_i \ F_{i+1} \ \ldots \ F_K]$. In some matrices, $\alpha_{pq}^i$ denotes the element at the p-th row and q-th column of a matrix $A_i$. For example, $h_{pq}^i$ denotes the element at the p-th row and q-th column of a matrix $H_i$, and $f_{pq}^i$ denotes the element at the p-th row and q-th column of a matrix $F_i$. In some matrices, $\alpha_p^i$ denotes the element at the p-th row and the first column of a matrix $A_i$ having a single column (i.e., of a column vector $A_i$) or $\alpha_p^i$ denotes the element at the first row and the p-th column of a matrix $A_i$ having a single row (i.e., of a row vector $A_i$). In some embodiments, $\alpha_p^i$ denotes elements in the p-th column of a matrix $A_i$. The desired signal $s_i$ may be uniformly distributed over a discrete and finite set $x_{m_i}^{N_i}$, which is an $N_i$-dimensional square lattice spanned by an $m_i$-QAM constellation in each dimension. For example, $m_i$ may be 16, 64, 256, etc.

FIGS. 3A, 3B, 3C, and 3D are respective quadrant diagrams of constellation bit encoding for 256-quadrature amplitude modulation (QAM). As shown in FIGS. 3A, 3B, 3C, and 3D, in each dimension, a total 8 bits of data may be mapped to 256 constellation points in a 256-QAM plane when $m_i$=256. For the $N_i$-th dimension, the $m_i$=256 constellation points are elements of the set $x_{m_i=256}^{N_i}$. Further, ($m_i$=2) and ($m_i$=4) may also be used, according to one or more exemplary embodiments. Further, $F_{/i}$ and $s_{/i}$ represent tall submatrices that include all the columns except the column vector for $STA_i$ as provided below in Equation 2.

$$F_{/i} = [F_1 \ldots F_{i-1} F_{i+1} \ldots F_K]$$

$$s_{/i}^T = [s_1^T \ldots s_{i-1}^T s_{i+1}^T \ldots s_K^T] \quad \text{Eq. 2}$$

The steering matrix F is, in an ideally implemented device, orthogonally organized in a manner that suppresses interference. However, in reality, compressed feedback is used to reconstruct the steering matrix $\hat{F}$, which may lead to interference terms. More specifically, the effect of the interference term $H_i F_{/i} s_{/i}$ may not be negligible in comparison with SU MIMO, owing to a quantization error.

For descriptive convenience, an illustrative example will be described with respect to the number of antennas of the AP 210 being four (M=4), the number of selected user stations 221, 222 being two (K=2), and the number of antennas per selected user station 221, 222 being two ($N_i$=2 for i=1, 2).

In the aforementioned configuration, $$H_1 = \begin{bmatrix} h_{11}^1 & h_{12}^1 & h_{13}^1 & h_{14}^1 \\ h_{21}^1 & h_{22}^1 & h_{23}^1 & h_{24}^1 \end{bmatrix},$$

$$H_2 = \begin{bmatrix} h_{11}^2 & h_{12}^2 & h_{13}^2 & h_{14}^2 \\ h_{21}^2 & h_{22}^2 & h_{23}^2 & h_{24}^2 \end{bmatrix},$$

$$F_1 = \begin{bmatrix} f_{11}^1 & f_{12}^1 \\ f_{21}^1 & f_{22}^1 \\ f_{31}^1 & f_{32}^1 \\ f_{41}^1 & f_{42}^1 \end{bmatrix}, \quad F_2 = \begin{bmatrix} f_{11}^2 & f_{12}^2 \\ f_{21}^2 & f_{22}^2 \\ f_{31}^2 & f_{32}^2 \\ f_{41}^2 & f_{42}^2 \end{bmatrix},$$

$$s = \begin{bmatrix} s_1^1 \\ s_2^1 \\ s_1^2 \\ s_2^2 \end{bmatrix}, \quad s_1 = \begin{bmatrix} s_1^1 \\ s_2^1 \end{bmatrix}, \quad s_2 = \begin{bmatrix} s_1^2 \\ s_2^2 \end{bmatrix},$$

$$v_1 = \begin{bmatrix} v_1^1 \\ v_2^1 \end{bmatrix}, \quad v_2 = \begin{bmatrix} v_1^2 \\ v_2^2 \end{bmatrix},$$

$$y_1 = \begin{bmatrix} y_1^1 \\ y_2^1 \end{bmatrix}, \quad y_2 = \begin{bmatrix} y_1^2 \\ y_2^2 \end{bmatrix}.$$

For $y_1$, $$\begin{bmatrix} y_1^1 \\ y_2^1 \end{bmatrix} = \begin{bmatrix} h_{11}^1 & h_{12}^1 & h_{13}^1 & h_{14}^1 \\ h_{21}^1 & h_{22}^1 & h_{23}^1 & h_{24}^1 \end{bmatrix} \begin{bmatrix} f_{11}^1 & f_{21}^1 & f_{11}^2 & f_{12}^2 \\ f_{21}^1 & f_{22}^1 & f_{21}^2 & f_{22}^2 \\ f_{31}^1 & f_{32}^1 & f_{31}^2 & f_{32}^2 \\ f_{41}^1 & f_{42}^1 & f_{41}^2 & f_{42}^2 \end{bmatrix} \begin{bmatrix} s_1^1 \\ s_2^1 \\ s_1^2 \\ s_2^2 \end{bmatrix} + \begin{bmatrix} v_1^1 \\ v_2^1 \end{bmatrix}$$

Utilizing channel state information (CSI) feedback from the selected user stations 221, 222, the channel matrices $H_1$, $H_2$ and the steering matrices $F_1$, $F_2$ may be determined (estimated).

To mitigate decoder degradation in an MU-MIMO environment, interference-aware decoding schemes may be employed, such as interference whitening, joint detection, and the like. One or more exemplary embodiments will be described with respect to joint detection with or without interference whitening.

Joint Detection Model for Interference Mitigation

In a typical interference-ignored MIMO decoder, when an interference component $H_i F_{/i} s_{/i}$ is regarded as noise, maximum-likelihood decoding minimizes the error probability $P_s(\hat{s}_{MLD,i} \neq s_i)$ as expressed in Equation 3:

$$\hat{s}_{MLD,i} = \text{argmin}_{s_i \in X_{m_i}^{N_i}} \|y_i - H_i \hat{F}_i s_i\|^2 \quad \text{Eq. 3}$$

where "argmin," the argument of the minimum, is the set of points of the given argument for which the given function attains its minimum value (for example, $\text{argmin}_x f(x) = \{x | \forall y: f(y) \geq f(x)\}$), the squared norm of $x_i$, $\|x_i\|^2 = x_i^H x_i$, $x_i^H$ is a Hermitian matrix of $x_i$ or $\|x_i\|^2 = x_i^e x_i$, $x_i^e$ is conjugate transpose of $x_i$, $\hat{F}_i$ is an estimate of M×$N_i$ steering matrix of $STA_i$ determined using a compressed beamforming procedure, e.g., the compressed beamforming procedure described in IEEE Computer Society, "Wireless LAN medium access control (MAC) and physical layer (PHY) specifications: Enhancements for very high throughput for operation in bands below 6 GHz," IEEE P802.11ac/D1.0 Std., January 2011. The symbol "^" indicates an estimate of the corresponding signal or matrix. For example, ŝ indicates an estimate of the signal s.

When M=4 and $N_i$=2, an estimate $\hat{s}_{MLD,1}$ of $s_1$ under maximum-likelihood detection may be determined according to Equation 3-1:

$$\hat{s}_{MLD,1} = \text{argmin}_{s_1 \in X_{m_i}^2} \left\| \begin{bmatrix} y_1^1 \\ y_2^1 \end{bmatrix} - H_1 \hat{F}_1 \begin{bmatrix} s_1^1 \\ s_2^1 \end{bmatrix} \right\|^2 \quad \text{Eq. 3-1}$$

Figure 4A:
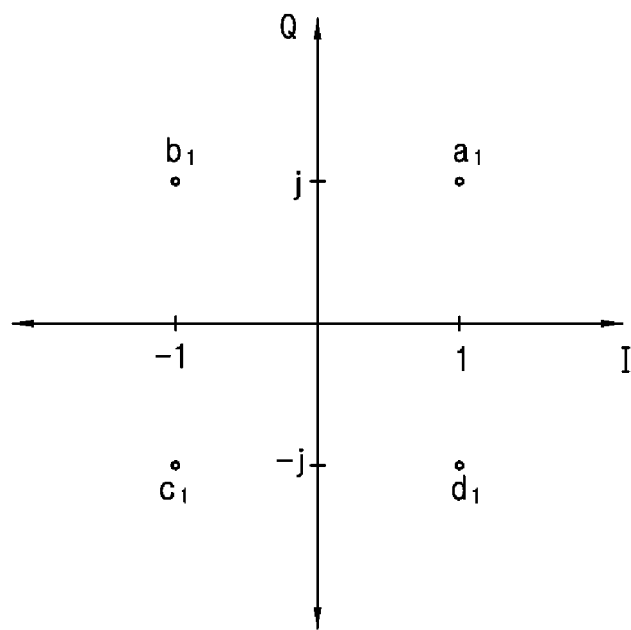
FIG. 4A is a diagram of an $N_t$-dimensional square lattice spanned by an $m_t$-QAM constellation in each dimension, according to one or more exemplary embodiments.
Figure 4A:
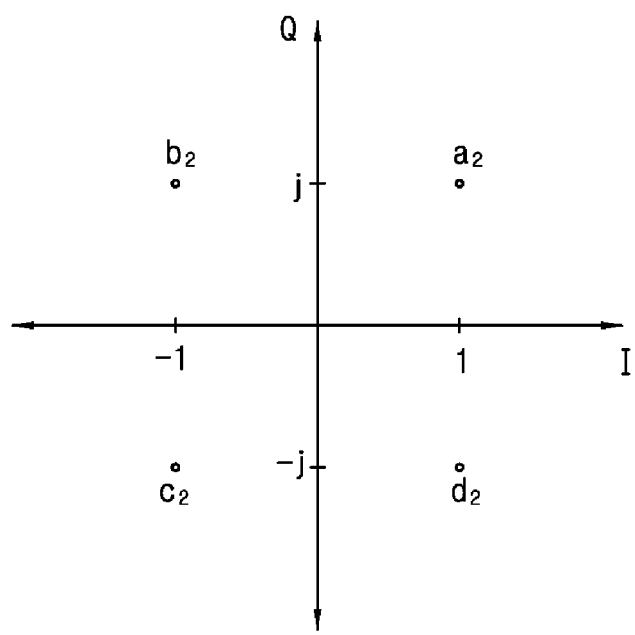
Figure 4B:
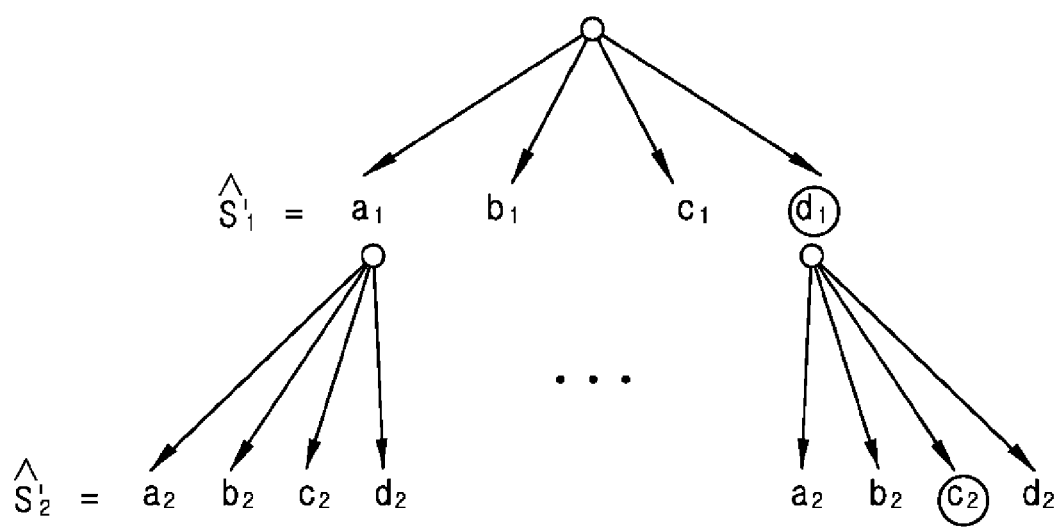
FIG. 4B is a diagram of an illustrative search tree with a masking-level difference at M=4, $N_1$=2, and 4-QAM (or a quadrature phase shift keying (QPSK) modulation) for streams of a single station (STA) in FIG. 2, according to one or more exemplary embodiments.

FIG. 4A is a diagram of an $N_i$-dimensional square lattice spanned by an $m_i$-QAM constellation in each dimension, according to one or more exemplary embodiments. FIG. 4B is a diagram of an illustrative search tree with a masking-level difference at M=4, $N_1$=2, and 4-QAM for streams of a single station (STA) in FIG. 2, according to one or more exemplary embodiments. For descriptive convenience, FIG. 4B is described with respect to $STA_1$ of FIG. 2.

When $m_i$=16, 64, 256, and the like, the $N_i$-dimensional square lattice is spanned by an $m_i$-QAM constellation in each dimension. If 4-QAM is used, possible constellation points $m_1$ in each of the two dimension $N_1$ are four as shown in FIG. 4A ($m_1$=4; $N_1$=2). Further, $$\begin{bmatrix} y_1^1 \\ y_2^1 \end{bmatrix}$$

is a vector of two received signals received by two antennas of the user station ($STA_1$) 221.

As shown in FIG. 4A, when $m_i$=4, the 2-dimensional square lattice is spanned by a 4-QAM constellation in each of the two dimensions for estimating $$\hat{s}_{MLD,1} = \begin{bmatrix} \hat{s}_1^1 \\ \hat{s}_2^1 \end{bmatrix}.$$

For $\hat{s}_1^1$ estimation, one of four points ($a_1$, $b_1$, $c_1$, $d_1$) is a possible candidate. For $\hat{s}_2^1$ estimation, one of four points ($a_2$, $b_2$, $c_2$, $d_2$) is a possible candidate. Thus, in the MLD of Equation 3-1, a total $4^2$(=16) combinations for ($\hat{s}_1^1$, $\hat{s}_2^1$) estimation are possible in 4-QAM constellation, i.e., ($a_1$, $a_2$), ($a_1$, $b_2$), ($a_1$, $c_2$), ($a_1$, $d_2$), ($b_1$, $a_2$), ($b_1$, $b_2$), ($b_1$, $c_2$), ($b_1$, $d_2$), ($c_1$, $a_2$), ($c_1$, $b_2$), ($c_1$, $c_2$), ($c_1$, $d_2$), ($d_1$, $a_2$), ($d_1$, $b_2$), ($d_1$, $c_2$), ($d_1$, $d_2$).

FIG. 4B illustrates the iterative calculations in a tree search format. The 16 combinations are used for ($s_1^1, s_2^1$) to determine 16 squared norms using Equation 3-1. For example, if the squared norm has the minimum value when ($s_1^1$, $s_2^1$)=($d_1$, $c_2$), the estimation ($\hat{s}_1^1$, $\hat{s}_2^1$) is determined as ($d_1$, $c_2$). This requires only 16 squared norms to be determined; however, the number of calculations increases exponentially when $N_i$ and $m_i$ increase. It is noted that the detection merely involves the determination of signals for the user station ($STA_1$) 221. In other words, the aforementioned detection does not use a joint detection scheme because it ignores the term $H_iF_{Ii}s_{Ii}$ along with the Gaussian noise as previously discussed.

However, as previously mentioned, the interference component $H_iF_{Ii}s_{Ii}$ may increase to such a degree that it can no longer be ignored. As such, to detect the entire streams, including the interference at $STA_i$, namely $\hat{s}_{MLD}^{i\ T}=[\hat{s}_{MLD,i}^{i\ T} \hat{s}_{MLD/i}^{i\ T}]$, a Maximum Likelihood (ML) decoder using joint detection to minimize the error probability $P_s(\hat{s}_{MLD}^i \neq s)$ may be expressed according to Equation 4:

$$\hat{s}_{MLD}^i = \mathrm{argmin}_{s \in \Omega} \left\| y_i - \overline{H}^i \begin{bmatrix} s_i \\ s_{Ii} \end{bmatrix} \right\|^2 \qquad \text{Eq. 4}$$

where $\Omega$ is a discrete and finite set of s, and $\overline{H}^i = H_i[\hat{F}_i\ \hat{F}_{Ii}]$, is an effective channel matrix of $STA_i$. To this end, $\hat{s}_{MLD}^i$ represents the entire symbol vector, which is detected in $STA_i$, and $\hat{s}_{ML,i}^i$ is the desired signal stream for $STA_i$ among $\hat{s}_{MLD}^i$.

In the interference ignoring receiver indicated in Equation 3, the total noise strength is $E[|H_iF_{Ii}s_{Ii}+v_i|^2]$; whereas the noise strength is $|v_i|^2$ in the interference-aware receiver detector shown in Equation 4. In the case of $E[|H_i\hat{F}_{Ii}s_{Ii}+v_i|^2] > E[|v_i|^2]$, the noise strength of Equation 4 becomes lower than that of Equation 3, thus leading to the improvement of the receiver performance.

However, the increased degree of channel matrices significantly increases the calculation complexity of the detector in Equation 4 compared to that of Equation 3. To resolve this complexity problem, the fixed-complexity sphere decoder (FSD) algorithm, known as the low-complexity algorithm in the SU-MIMO, is examined and modified FSD algorithms for MU-MIMO will be described below. According to one or more exemplary embodiments, a method and apparatus for applying a reordered FSD scheme to detect MU-MIMO symbols will be provided.

Model of Channel Matrix Expansion on Generalized Sphere Decoder

In Equation 4, the signal detection of the entire s on $STA_i$, $\hat{s}_{MLD}^i$, should be first performed to detect $\hat{s}_{MLD,i}^i$. However, because effective channel matrix $\overline{H}^i$ is an $N_i \times M$ matrix (when $\Sigma_{i=1}^K N_i = M$) and $N_i < M$, the rank of the effective channel matrix $\overline{H}^i$ is deficient. In this case, to apply an SD-based algorithm for a low error probability, the following change can be possible, as explained in M. O. Damen, K. Abed-Meraim, and J.-C. Belfiore, "Generalised sphere decoder for asymmetrical space-time communication architecture," *Electronics Lett.*, vol. 36, pp. 166-167, January 2000:

$$\hat{s}_{MLD}^i = \mathrm{argmin}_{s \in \Omega} \|\overline{y}^i - D^i s\|^2 \qquad \text{Eq. 5-1}$$

where $$G^i = \overline{H}^{iH}\overline{H}^i = \sigma^2 I_M = D^{iH} D^i \qquad \text{Eq. 5-2}$$

$$\overline{y}^i = G^{i-2}\overline{H}^{iH} y_i \qquad \text{Eq. 5-3}$$

Consequently, effective channel matrix $\overline{H}^i$ is extended to a full-rank $M \times M$ matrix $D^i$; thus, the detection of all elements in $\hat{s}_{MLD}^i$ is possible with SD-based algorithm including FSD algorithm. In some embodiments, the term, $\sigma^2 I_M$, may be ignored, then $G^i = \overline{H}^{iH}\overline{H}^i = D^{iH}D^i$ may be used.

Extended Fixed-Complexity Sphere Decoder for Downlink MU-MIMO System

A detector without considering interferences suffers from performance degradation by low signal-to-interference ratio (SIR). On the other hand, the optimal joint MU-MIMO detector suffers from an implementation complexity problem. In this sense, the FSD based algorithm would be attractive solution promising low complexity for supporting MU-MIMO communication system. In this disclosure, a new extended FSD decoder based on reconstruction of interference channel matrix for interference mitigation on MU-MIMO communication system is provided. One or more exemplary embodiments provides methods based on the channel matrix expansion using the generalized SD (GSD) and a new channel matrix reconstruction to offer enhanced receiver performance for each STA.

Adaptation of Conventional Fixed-Complexity Sphere Decoder

The FSD algorithm is one of the algorithms designed to simplify the calculation complexity problem in which the MLD expressed through Equation 3 exponentially increases based on modulation and to the degrees of the transmission antenna. The FSD considerably reduces calculation complexity using $S_i \subset x_{m_i}^{N_i}$, the restricted search space by the node distribution vector of $n_{S_i} = (n_{i,1}, n_{i,2}, \ldots, n_{i,N_i})$ instead of $x_{m_i}^{N_i}$, and the entire search space of the MLD. The process can be written as $$\hat{s}_{FSD,i} = \mathrm{argmin}_{s_i \in S_i} \|y_i - H_i\hat{F}_i s_i\|^2 \qquad \text{Eq. 6}$$

Thus, the value of $n_{i,j}$, the $j^{th}$ element of $n_{S_i}$, is either one or $m_i$, according to the required receiver performance. When the entire $n_{i,j}$ value is one, $\hat{s}_{FSD,i}$ is same with $\hat{s}_{ZF,i}$ for all i through the single route search, as observed in the zero-forcing detector. Further, when the entire $n_{i,j}$ value is $m_i$, a decrease in the search space because of static branching does not occur, thus indicating that $\hat{s}_{FSD,i}$ is same with $\hat{s}_{MLD,i}$ as observed by the MLD.

To obtain quasi-ML performance, when the number of single-search (SS) layers and full-search (FS) layers are expressed as $1_{i,SS}$ and $1_{i,FS}$ respectively, the FSD needs to satisfy the constraint conditions shown in Equation 7.

$$l_{i,FS} \geq \lceil \sqrt{N_i} - 1 \rceil, l_{i,SS} = N_i - l_{i,FS} \qquad \text{Eq. 7}$$

Under these conditions, the number of symbols searched by the FSD algorithm is $m_i^{l_{i,FS}}$. For example, when $N_i=4$, $l_{i,SS}=3$ and $l_{i,FS}=1$. Accordingly, $n_{S_i}$ will be $(1,1,1,m_i)$ and the number of the searched symbols is $m_i$.

After determining the $l_{i,FS}$ and $l_{i,SS}$, The FSD channel matrix ordering which determines the detection ordering of the signal $s_{i,j}$, for $j=1, \ldots, N_i$, may be performed with channel matrix $$H_i \hat{F}_i = \begin{bmatrix} \bar{h}^i_{11} & \cdots & \bar{h}^i_{1N_i} \\ \vdots & \ddots & \vdots \\ \bar{h}^i_{N_i 1} & \cdots & \bar{h}^i_{N_i N_i} \end{bmatrix}$$

to achieve quasi-ML performance (L. G. Barbero and J. S. Thompson, "Fixing the complexity of the sphere decoder for MIMO detection," *IEEE Trans. Wireless Commun.*, vol. 7, pp. 2131-2142, June 2008.). In this process, the $N_i$ columns of $\underline{H}_i = H_i \hat{F}_i$ are ordered iteratively so that the signals with largest post-processing noise amplification are detected in the FS layers. On the other hand, the signals with smallest post processing noise amplification are detected in the SS layers.

When $u_i$ is the index vector used to the FSD ordering, it can be determined in every iteration according to the following, for $k=N_i, N_i-1, \ldots, 1$.

(A) When, the k+1th index element of $u_i$, $u_{i,k+1}$ is obtained through the previous repetition process and $\underline{H}_{i,(u_{i,k+1})}$ is the matrix in which columns of $u_{i,k+1}$ selected through the previous repetition process are replaced with zero column vector, $\underline{H}_{i,(u_{i,k+1})}^\dagger = (\underline{H}_{i,(u_{i,k+1})}^H \underline{H}_{i,(u_{i,k+1})})^{-1} \underline{H}_{i,(u_{i,k+1})}^H$ is calculated. $\underline{H}_{i,(u_{i,k+1})}^\dagger$ is the pseudo-inverse of $\underline{H}_{i,(u_{i,k+1})}$.

(B) When $(\underline{H}_{i,(u_{i,k+1})}^\dagger)_j$ is the $j^{th}$ row of $\underline{H}_{i,(u_{i,k+1})}^\dagger$ with $j \in [1, N_i] - \{u_{i,k+1}\}$, the index $u_{i,k}$ is calculated through Equation 8.

$$u_{i,k} \begin{cases} \arg\max_j \| \underline{H}_{i,(u_{i,k+1})}^\dagger)_j \|^2, & \text{if } n_{i,k} = m_i \\ \arg\min_j \| \underline{H}_{i,(u_{i,k+2})}^\dagger)_j \|^2, & \text{if } n_{i,k} \neq m_i \end{cases} \qquad \text{Eq. 8}$$

where $$\underline{H}_{i,(u_{i,k+1})} = \underline{H}_i$$

for initial condition.

Using the index vector $u_i$, the ordered channel matrix $\tilde{H}_i$ by ordering columns of $\underline{H}_i$ can be obtained as below:

$$\tilde{H}_i = [\bar{h}_{i,u_{i,1}} \quad \bar{h}_{i,u_{i,2}} \cdots \quad \bar{h}_{i,u_{i,N_i}}] \qquad \text{Eq. 9}$$

where $\bar{h}_{i,u_{i,k}}$ is $u_{i,k}$th column vector of $\underline{H}_i$.

Then the $\hat{s}_{FSD,i}$ can be obtained by sequencing $\underline{H}_i$ using $u_i = (u_{SS,i}, u_{FS,i})$ which are obtained by repeating the process above and by performing the FSD tree search: it is similar to SD tree search in finding minimum Euclidean distance from N-1 to 0 layer, but its search tree isn't expanded to cover all $m_i$-QAM constellation in $u_{SS,i}$ layers.

The basic FSD algorithm is known as the symbol detection method for the suboptimal MIMO that can be realized with low complexity in the typical MIMO communication system. Hereinafter, a method for effectively applying this algorithm in the MU-MIMO communication system will be provided.

Extended Scheme Using Reconstruction of Channel Matrix for Interference Mitigation In common, the FSD algorithm has two components affecting receiver performance: 1) the structure of search tree and 2) channel matrix ordering. In conventional FSD, the search tree is divided into full-search (FS) layers and single-search (SS) layers according to Equation 7 for offering quasi-ML performance i.e., satisfying Equation 10.

$$P_s(\hat{s}_{FSD,i} \neq s_i) \leq P_s(\hat{s}_{MLD,i} \neq s_i) + P_s(s_i \in \tilde{S}) \qquad \text{Eq. 10}$$

In particular, whenever $P_s(s_i \in \tilde{S}) \ll P_s(\hat{s}_{MLD,i} \neq s_i)$, the FSD will experience close to optimal performance, and it is proved in the paper, M. O. Damen, K. Abed-Meraim, and J.-C. Belfiore, "Generalised sphere decoder for asymmetrical space-time communication architecture," *Electronics Lett.*, vol. 36, pp. 166-167, January 2000. In addition, through ordering, the channel matrix is ordered so that a signal with low signal strength is detected in the FS layers, in contrast to that in the SS layers (See J. Jalden, L. G. Barbero, B. Ottersten and J. S. Thompson, "The Error probability of the fixed-complexity sphere decoder," *IEEE Trans. Signal Processing*, vol. 57, pp. 2711-2720, July 2009 ("Jalden et al.").).

However, in case this method is applied to interference-aware joint, the search tree corresponding to extended channel matrix $D^i$ may be divided into FS layers with $l_{FS}^i \geq \lceil \sqrt{M} - 1 \rceil$ and SS layers to satisfy $l_{SS}^i = M - l_{FS}^i$ (when $\Sigma_{i=1}^K N_i = M$). Through channel matrix ordering described in previous subsection, the interference channels are input to the FS layers because the signal strengths of the interference signal streams are mostly low. i.e., the channels corresponding to the desired signals are input to the SS layers.

Thus, the error probability $P_s(\hat{s}_{FSD}^i \neq s)$ for the entire $\hat{s}_{FSD}^i$ detected in $STA_i$ has a quasi-ML performance according to Jalden et al. However, the error probability of the desired signal $P_s(\hat{s}_{FSD,i}^i \neq s_i)$ cannot have a quasi-ML performance because each $\hat{s}_{FSD,i}^i$ symbol operates in the SS layer, i.e., the error probability $P_s(\hat{s}_{FSD}^i \neq s)$ is not optimal because $P_s(s_i \in \tilde{S}_i^i)$ cannot assume less then $P_s(\hat{s}_{MLD,i} \neq s_i)$.

Therefore, to ensure a quasi-ML performance of $P_s(\hat{s}_{FSD}^i \neq s)$ and $P_s(\hat{s}_{FSD,i}^i \neq s_i)$, columns that are larger than $\lceil \sqrt{M} - 1 \rceil$ in the effective channel matrix $\bar{H}^i$ of the entire signal streams need to be included in the FS layers. Similarly, columns those are larger than $\lceil \sqrt{N_i} - 1 \rceil$ in the matrix $H_i \hat{F}_i$ of the desired signal streams need to be included in the FS layers.

Under this condition, the modified FSD ordering is characterized as follows, according to one or more exemplary embodiments.

Figure 5:
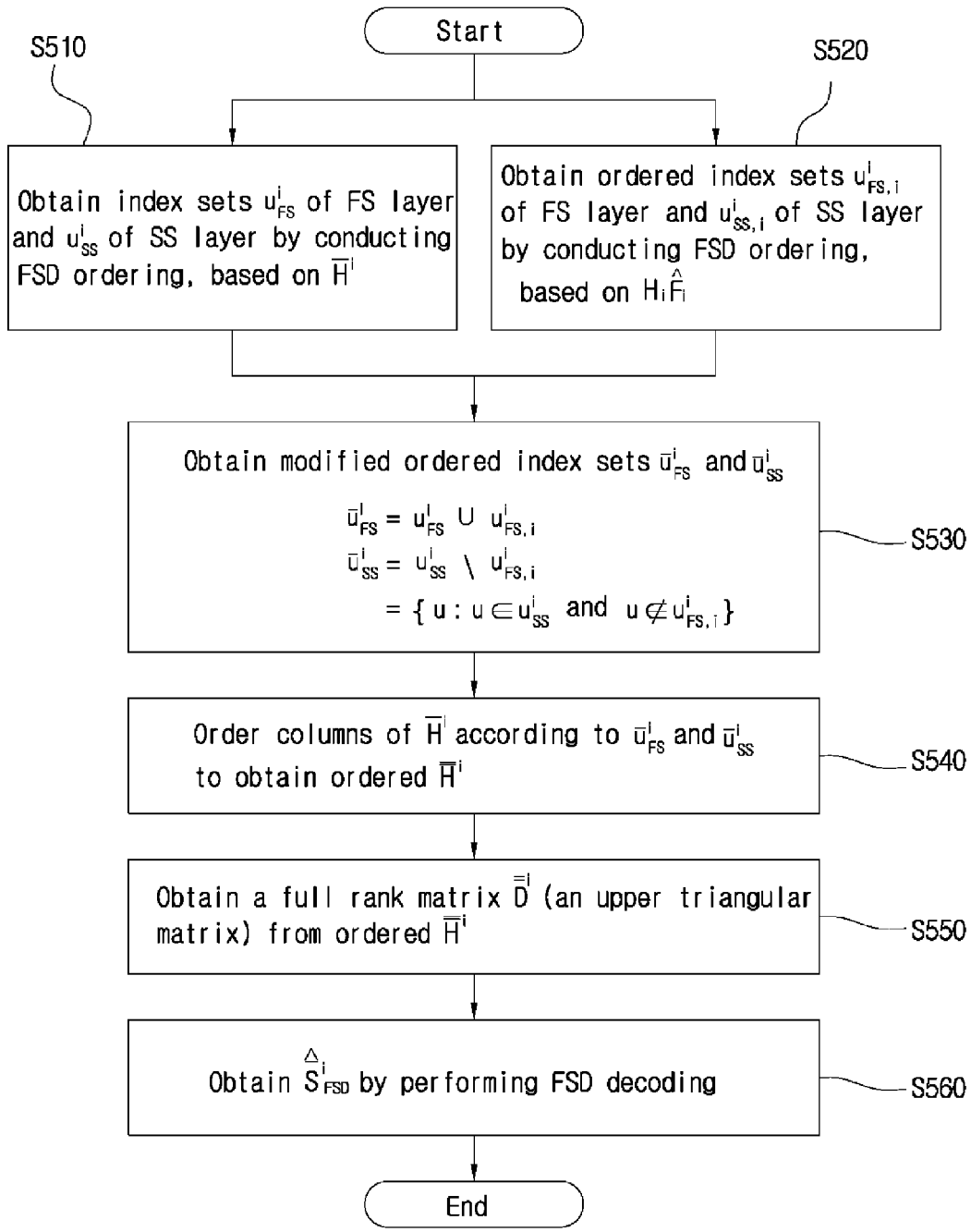
FIG. 5 is a flowchart of a process for modifying a fixed sphere decoding (FSD) ordering scheme, according to one or more exemplary embodiments.

FIG. 5 is a flowchart of a process for modifying a fixed sphere decoding (FSD) ordering scheme, according to one or more exemplary embodiments.

Referring to FIG. 5, in operation S510, by conducting FSD ordering using $\overline{H}^i$, the index set $u_{FS}{}^i$ of the FS layer of $\ddot{H}^i$, which is ordered from $\overline{H}^i$, and the index set $u_{SS}{}^i$ of the SS layer of $\ddot{H}^i$ may be obtained.

According to one or more exemplary embodiments, the effective channel matrix $\overline{H}^i$, an $N_r \times M$ matrix (when $\Sigma_{i=1}^K N_i = M$) may be ordered to obtain the index set $u_{FS}{}^i$ of the FS layer of $\ddot{H}^i$ and the index set $u_{SS}{}^i$ of the SS layer of $\ddot{H}^i$ so that the signals with largest post-processing noise amplification are detected in the FS layers (columns of $\overline{H}^i$ having relatively lower power are detected in the FS layers of $\ddot{H}^i$). On the other hand, the signals with smallest post processing noise amplification are detected in the SS layers (columns of $\overline{H}^i$ having relatively higher power are detected in the SS layers of $\ddot{H}^i$).

When u is the index vector used to the FSD ordering, it can be determined in every iteration according to the following, for k=M, M-1, . . . , 1.

(A) When, the k+1th index element of u, $u_{k+1}$ is obtained through the previous repetition process and $\overline{H}_{(u_{k+1})}$ is the matrix in which columns of $u_{k+1}$ selected through the previous repetition process are replaced with zero column vector, $\overline{H}_{(u_{k+1})}{}^\dagger = (\overline{H}_{(u_{k+1})}{}^{i\,H} \overline{H}^i{}_{(u_{k+1})})^{-1} \overline{H}^i{}_{(u_{k+1})}{}^H$ is calculated.

(B) When $(\overline{H}^i{}_{(u_{k+1})}{}^\dagger)_j$ is the $j^{th}$ row of $\overline{H}^i{}_{(u_{k+1})}{}^\dagger$ with $j \in [1, M] - \{u_{k+1}\}$, the index $u_k$ is calculated through Equation 8.

$$u_k = \begin{cases} \text{argmax}_j \left\| (\overline{H}^i_{(u_{k+1})}{}^\dagger)_j \right\|^2, & \text{if } n_k = m_i \\ \text{argmin}_j \left\| (\overline{H}^i_{(u_{k+2})}{}^\dagger)_j \right\|^2, & \text{if } n_k \neq m_i \end{cases} \quad \text{Eq. 8}$$

where $\overline{H}^i{}_{(u_{M+1})} = \overline{H}^i$ for initial condition. According to the Equation 8, the magnitudes of rows of $\overline{H}^i{}_{(u_{k+1})}$ are compared and arranged. $\|(\overline{H}^i{}_{(u_{k+1})})_j\|^2$ is the squared norm of the $j^{th}$ row of $\overline{H}^i{}_{(u_{k+1})}$, which is associated with $(\overline{H}^i{}_{(u_{k+1})})_j$, the $j^{th}$ column of $\overline{H}^i{}_{(u_{k+1})}$. Further, if $\|(\overline{H}^i{}_{(u_{k+1})})_j\|^2$ has the maximum magnitude for the $j=m^{th}$ row of $\overline{H}^i{}_{(u_{k+1})}$, $\|(\overline{H}^i{}_{(u_{k+1})})_j\|^2$ has the minimum magnitude for the $j=m^{th}$ column of $\overline{H}^i{}_{(u_{k+1})}$. If $\|(\overline{H}^i{}_{(u_{k+1})})_j\|^2$ has the minimum magnitude for the $j=n^{th}$ row of $\overline{H}^i{}_{(u_{k+1})}$, $\|(\overline{H}^i{}_{(u_{k+1})})_j\|^2$ has the maximum magnitude for the $j=n^{th}$ column of $\overline{H}^i{}_{(u_{k+1})}$.

Using the index vector u, the ordered channel matrix $\ddot{H}^i$ by ordering columns of $\overline{H}^i$ can be obtained as below:

$$\ddot{H}^i = [\overline{h}_{u_1}{}^i \overline{h}_{u_2}{}^i \ldots \overline{h}_{u_M}{}^i] \quad \text{Eq. 9}$$

where is $\overline{h}_{u_k}{}^i$ is $u_k$th column vector of $\overline{H}^i$.

From the $\ddot{H}^i$, which is ordered from $\overline{H}^i$, columns that are larger than $\lceil\sqrt{M}-1\rceil$ from the rightmost column of $\ddot{H}^i$ are included in the full search (FS) layers (corresponding to the index set $u_{FS}{}^i$). For example, if M is 8, at least two columns, $\overline{h}_{u_M}{}^i$ and $\overline{h}_{u_{M-1}}{}^i$, are included in the FS layers ($\lceil\sqrt{8}-1\rceil=2$). The index set $u_{FS}{}^i$ of the FS layers of the ordered $\ddot{H}^i$ may be obtained from the at least two columns, $\overline{h}_{u_M}{}^i$ and $\overline{h}_{u_{M-1}}{}^i$, and the index set $u_{SS}{}^i$ of the SS layers of the ordered $\ddot{H}^i$ may be obtained from the rest columns other than the at least two columns, $\overline{h}_{u_M}{}^i$ and $\overline{h}_{u_{M-1}}{}^i$.

In operation S520, by conducting FSD ordering using $H_i\hat{F}_i$, the ordered index set $u_{FS,i}{}^i$ of the FS layer of $\tilde{H}_i$ and the ordered index set $u_{SS,i}{}^i$ of the SS layer of $\tilde{H}_i$ are obtained.

From the $\tilde{H}_i$, which is ordered from $H_i\hat{F}_i$, columns that are larger than $\lceil\sqrt{N_i}-1\rceil$ from the rightmost column of $\tilde{H}_i$ are included in the FS layers of $\tilde{H}_i$. For example, as described above with respect to Equations 8 and 9, if $N_i$ is 4, at least one column, $$\overline{h}_{i,u_{i,N_i}},$$

is included in the FS layers ($\lceil\sqrt{4}-1\rceil=1$). The index set $u_{FS,i}{}^i$ of the FS layers of the ordered $\tilde{H}_i$ may be obtained from the at least one column, $$\overline{h}_{i,u_{i,N_i}},$$

and the index set $u_{SS,i}{}^i$ of the SS layers of the ordered $\tilde{H}_i$ may be obtained from the rest columns other than the at least one column, $$\overline{h}_{i,u_{i,N_i}}.$$

In operation S530, by using the ordered index set obtained previously, the modified ordered index set $\overline{u}_{FS}{}^i$ and $\overline{u}_{SS}{}^i$ may be obtained using the following equations:

$$\overline{u}_{FS}^i = u_{FS}^i \cup u_{FS,i}^j$$

$$\overline{u}_{SS}^i = u_{SS}^i \setminus u_{FS,i}^j \quad \text{Eq. 1}$$

$$= \{u: u \in u_{SS}^i \text{ and } u \notin u_{FS,i}^j\}$$

Consequently, the number of FS layers $l_{FS}{}^i$ and the number of SS layers $l_{SS}{}^i$ are obtained through the following conditions under which both $P_s(\hat{s}_{ML,i}{}^i \neq s_i)$ and $P_s(\hat{s}_{ML}{}^i \neq s)$ satisfy the quasi-ML performance:

$$l_{FS}^i = |\overline{u}_{FS}^i|$$

$$l_{SS}^i = M - l_{FS}^i = |\overline{u}_{SS}^i| \quad \text{Eq. 12}$$

where $|\overline{u}_{FS}{}^i|$ is the number of elements of the set $\overline{u}_{FS}{}^i$, and $|\overline{u}_{SS}{}^i|$ is the number of elements of the set $\overline{u}_{SS}{}^i$.

In operation S540, $\overline{H}^i$ may be reordered according to $\overline{u}_{FS}{}^i$ and $\overline{u}_{SS}{}^i$. Accordingly, columns of the set $\overline{u}_{FS}{}^i$ are located on the right side of the columns of the set $\overline{u}_{SS}{}^i$. The modified ordered matrix $\overline{H}^i$, (hereinafter, $\overline{H}^i$ may be referred to as "modified effective channel matrix") by ordering columns of $\overline{H}^i$ can be obtained. The modified effective channel matrix $\overline{H}^i$ has differently ordered columns of $\overline{H}^i$, and has at least one more FS layer than $\ddot{H}^i$ by adding, into the FS layer of $\overline{H}^i$, the column corresponding to the ordered index set $u_{FS,i}{}^i$ of the FS layer of $\tilde{H}_i$. In operation S550, an M×M full rank matrix, $\overline{D}^i$, may be calculated from the reordered $\overline{H}^i$ ($N_r \times M$) based on Cholesky Decomposition, e.g., Equation 13 shown below:

$$\overline{G}^i = \overline{H}^{i\,H} \overline{H}^i + \sigma^2 I_M = \overline{D}^{i\,H} \overline{D}^i \quad \text{Eq. 13}$$

Here, the extended full rank matrix $\overline{D}^i$ may be an upper triangular matrix. In some embodiments, the term, $\sigma^2 I_M$, may be ignored, then $\overline{G}^i = \overline{H}^{i\,H} \overline{H}^i = \overline{D}^{i\,H} \overline{D}^i$ may be used.

In operation S560, an FSD decoding may be performed using a joint detection scheme to obtain $\overline{\hat{s}}_{FSD}{}^i$. For example, the following Equations may be used along with the Equation 13.

$$\hat{\bar{s}}_{FSD}^{i} = \mathrm{argmin}_{s\in\tilde{\delta}}\left\|\hat{\bar{y}}^{i} - \overline{\overline{D}}^{i}\bar{s}\right\|^{2} \qquad \text{Eq. 14-1}$$

$$= \mathrm{argmin}_{s\in\tilde{\delta}}\left\|\overline{\bar{y}}^{i} - \overline{\overline{H}}^{i}\bar{s}\right\|^{2}$$

$$\bar{y}^i = \overline{\overline{G}}^{i^{-1}} \overline{\overline{H}}^{i^H} \overline{\bar{y}}^i \text{ or} \qquad \text{Eq. 14-2}$$

$$\bar{y}^i = \overline{\overline{H}}^{i\dagger} \overline{\bar{y}}^i = \left(\overline{\overline{H}}^{i^H} \overline{\overline{H}}^i\right)^{-1} \overline{\overline{H}}^{i^H} \overline{\bar{y}}^i \qquad \text{Eq. 14-3}$$

where $\tilde{\bar{s}}_{MLD}^{i} = \mathrm{argmin}_{s\in\tilde{\Omega}}\|\bar{y}^i - \overline{H}^i\bar{s}\|^2$ (with ordering), $\hat{s}_{MLD}^{i} = \mathrm{argmin}_{s\in\tilde{\Omega}}\|y_i - \overline{H}^i s\|^2$ (before ordering), S is the restricted search space of $\Omega = \Pi_{i=1}^{K} x_{m_i}^{N_i}$, i.e., ($\tilde{S} \subset \Omega$). Columns of $\bar{s}^T$ are ordered by ordering columns of $s^T$ and Columns of $\bar{y}^T$ are ordered by ordering columns of $y^T$, according to the modified column ordering of $\overline{H}^i$ from $H^i$. The FSD under the joint detection scheme considerably reduces calculation complexity for determining total M symbols using the S defined by a node distribution vector of $n_s = (n_1, n_2, \ldots, n_M)$, instead of $\Omega$ and the entire search space of the MLD under the joint detection scheme.

In addition, unlike a comparative example shown in Koo et al., "An extendable Fixed-Complexity Sphere Decoder for Downlink Multi-User MIMO Communication System," *The journal of Korea Information and Communications Society*, vol. 39A No. 04, pp. 180-187, April 2014, the example of FIG. 5 reduces the number of Cholesky decomposition processes and eliminates the ordering process of $D_i$. Accordingly, a relatively reduced complexity of calculations and faster processing time may be attained while providing the same efficient performance described above.

The value of $n_j$, the $j^{th}$ element of $n_s$, is either one or $m_i$, according to the required receiver performance. For example, $n_s$ may be (1, 1, . . . , $m_i$, $m_i$) where the elements corresponding to one are associated with the SS layers and the elements corresponding to $m_i$ are associated with the FS layers.

In an example, when M=8, $N_1$=4, $N_2$=4, K=2, $H^1 = [\bar{h}^1{}_1 \ \bar{h}^1{}_2 \ \bar{h}^1{}_3 \ \bar{h}^1{}_4 \ \bar{h}^1{}_5 \ \bar{h}^1{}_6 \ \bar{h}^1{}_7 \ \bar{h}^1{}_8]$ is a 4×8 matrix. Through an FSD ordering, an ordered $\ddot{H}^1 = [\bar{h}^1{}_{u_1} \ \bar{h}^1{}_{u_2} \ldots \bar{h}^1{}_{u_8}]$ may be obtained. For example, $H^1$ may be ordered to obtain $\ddot{H}^1 = [\bar{h}^1{}_3 \ \bar{h}^1{}_4 \ \bar{h}^1{}_1 \ \bar{h}^1{}_2 \ \bar{h}^1{}_6 \ \bar{h}^1{}_5 \ \bar{h}^1{}_8 \ \bar{h}^1{}_7]$. If only two columns are included in FS layers, then the two rightmost columns of FSD ordered effective channel matrix, the column 7 and the column 8 of $H^1$, may be included in the FS layers of $\ddot{H}^1$ based on the ordering of $[\bar{h}^1{}_3 \ \bar{h}^1{}_4 \ \bar{h}^1{}_1 \ \bar{h}^1{}_2 \ \bar{h}^1{}_6 \ \bar{h}_1{}^5 \ \bar{h}^1{}_8 \ \bar{h}^1{}_7]$. Then, $u_{FS}^1 = \{8, 7\}$ (See S510).

Further, a 4×4 matrix $H_1\hat{F}_1 = [\bar{h}^1{}_1 \ \bar{h}^1{}_2 \ \bar{h}^1{}_3 \ \bar{h}^1{}_4]$ may be ordered through an FSD ordering and ordered $\hat{H}_1 = [\bar{h}^1{}_4 \ \bar{h}^1{}_1 \ \bar{h}^1{}_2 \ \bar{h}^1{}_3]$ may be obtained. If only one column is included in an FS layer, then the rightmost column of the FSD ordered $\tilde{H}_1$, the column 3 of $H_1\hat{F}_1$, is included in the FS layers of $\tilde{H}_1$. Then, $u_{FS,1}^1 = \{3\}$ (See S520). The column(s) of $H^1$ corresponding to $u_{FS,1}^1$ may be positioned at the rightmost column(s) of reordered $\overline{H}^1$ as shown below.

According to S530 and S540, $\overline{H}^1$ may be determined as $\overline{H}^1 = [\bar{h}^1{}_4 \ \bar{h}^1{}_1 \ \bar{h}^1{}_2 \ \bar{h}^1{}_6 \ \bar{h}^1{}_5 \ \bar{h}^1{}_8 \ \bar{h}^1{}_7 \ \bar{h}^1{}_3]$, and the set of the modified FS layers of $\overline{H}^1$ is $\bar{u}_{FS}^1 = u_{FS}^1 \cup u_{FS,1}^1 = \{8, 7, 3\}$. In this way, the FS layers of $\tilde{H}_1$ can be included in FS layers of joint detection FSD decoding process, which reduces error probability of the MU-MIMO joint detection using the FSD decoding.

In addition, the process described with respect to FIG. 5 does not require more than one Cholesky Decomposition and does not require ordering processes of the full-rank matrix $D^i$.

Further, according to one or more exemplary embodiments, the second right most column $\bar{h}^1{}_2$ of $\tilde{H}_1$ may be optionally included in the FS layer. Then, $\overline{H}^1$ may be determined as $\overline{H}^1 = [\bar{h}^1{}_4 \ \bar{h}^1{}_1 \ \bar{h}^1{}_6 \ \bar{h}^1{}_5 \ \bar{h}^1{}_8 \ \bar{h}^1{}_7 \ \bar{h}^1{}_2 \ \bar{h}^1{}_3]$. Then, the set of the modified FS layers is $\bar{u}_{FS}^1 = u_{FS}^1 \cup u_{FS,1}^1 = \{8, 7, 2, 3\}$. However, the order among columns 8, 7, 2, 3 may be changed. In this case, if the total number of the FS layers is limited to three, then column 8 may be included in the SS layers. In other words, $\bar{u}_{FS}^1 = u_{FS}^1 \cup u_{FS,1}^1 = \{7, 2, 3\}$. According to another example, at least one column, e.g., column 8, or a column in $\bar{u}_{SS}^1$, may be eliminated from $\bar{u}_{FS}^1$ and $\bar{u}_{SS}^1$, and the eliminated column(s) may be processed by an interference whitening process, which will be described later in more detail.

Although the above examples are described when $\Sigma_{i=1}^{K} N_i = M$, in general, $\overline{D}^i$ is a $\Sigma_{i=1}^{K} N_i \times \Sigma_{i=1}^{K} N_i$ matrix, and $\overline{H}^i$ is an $N_i \times \Sigma_{i=1}^{K} N_i$ matrix, especially when $\Sigma_{i=1}^{K} N_i \neq M$.

Figure 6:
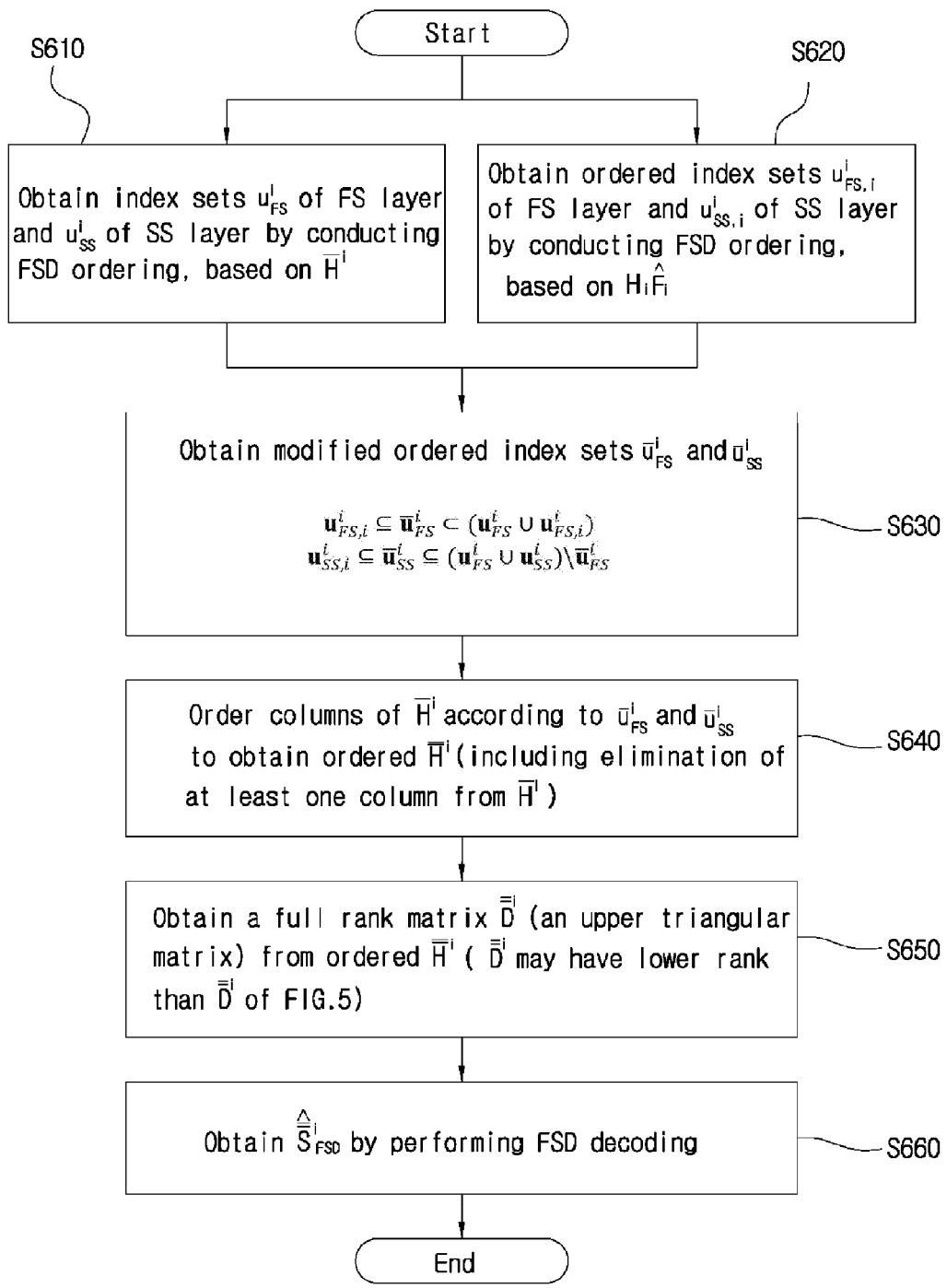
FIG. 6 is a flowchart illustrating of a process for modifying a fixed sphere decoding (FSD) ordering scheme, according to one or more exemplary embodiments.

FIG. 6 is a flowchart illustrating of a process for modifying a fixed sphere decoding (FSD) ordering scheme, according to one or more exemplary embodiments.

Referring to FIG. 6, in operation S610 (similar to the operation S510 of FIG. 5), by conducting FSD ordering using $H^i$, the index set $u_{FS}^i$ of the FS layer of $\ddot{H}^i$ and the index set $u_{SS}^i$ of the SS layer of $\ddot{H}^i$ are obtained.

In operation S620 (similar to the operation S520 of FIG. 5), by conducting FSD ordering using $H_i\hat{F}_i$, the ordered index set $u_{FS,i}^i$ of the FS layer of $\tilde{H}_i$ and the ordered index set $u_{SS,i}^i$ of the SS layer of $\tilde{H}_i$ are obtained.

In operation S630, by using the ordered index set obtained previously, the modified ordered index set $\bar{u}_{FS}^i$ and $\bar{u}_{SS}^i$ are obtained using the following equations:

$$u_{FS,i}^i \subseteq \bar{u}_{FS}^i \subset (u_{FS}^i \cup u_{FS,i}^i)$$

$$u_{SS,i}^i \subseteq \bar{u}_{SS}^i \subseteq (u_{FS}^i \cup u_{SS}^i) \backslash \bar{u}_{FS}^i = \{u : u \in (u_{FS}^i \cup u_{SS}^i) \text{ and } u \notin \bar{u}_{FS}^i\} \qquad \text{Eq. 15}$$

Consequently, the number of FS layers $l_{FS}^i$ and the number of SS layers $l_{SS}^i$ are obtained through the following conditions under which both $P_s(\hat{s}_{ML,i}^i \neq s_i)$ an $P_s(\hat{s}_{ML}^i \neq s)$ satisfy the quasi-ML performance:

$$l_{FS}^i = |\bar{u}_{FS}^i|$$

$$l_{SS}^i = |\bar{u}_{SS}^i| \qquad \text{Eq. 16}$$

where $|\bar{u}_{FS}^i|$ is the number of elements of the set $\bar{u}_{FS}^i$, and $|\bar{u}_{SS}^i|$ is the number of elements of the set $\bar{u}_{SS}^i$. Unlike the embodiment of FIG. 5, $|\bar{u}_{FS}^i| + |\bar{u}_{SS}^i|$ may be smaller than M (or smaller than $\Sigma_{i=1}^{K} N_i$ when $\Sigma_{i=1}^{K} N_i \neq M$). For example, $|\bar{u}_{FS}^i| + |\bar{u}_{SS}^i|$ may be M $-|\bar{u}_n^i|$, where $|\bar{u}_n^i|$ is the number of elements of the set $\bar{u}_n^i$, and $\bar{u}_n^i = (u_{FS}^i \cup u_{SS}^i) \backslash (\bar{u}_{FS}^i \cup \bar{u}_{SS}^i)$.

In operation S640, $\overline{H}^i$ may be reordered according to $\bar{u}_{FS}^i$ and $\bar{u}_{SS}^i$. Accordingly, columns of the set $\bar{u}_{FS}^i$ are located on the right side of the columns of the set $u_{SS}^i$. The modified ordered matrix $\overline{H}^i$ by ordering columns of $\overline{H}^i$ can be obtained. The modified ordered matrix $\overline{H}^i$ has differently ordered columns of $\overline{H}^i$, and adds, into the FS layer of $\overline{H}^i$, the column corresponding to the ordered index set $u_{FS,i}^i$ of the FS layer of $\tilde{H}_i$. Further, unlike the embodiment of FIG. 5, $\overline{H}^i$ may have fewer columns than $\overline{H}^i$.

In an example, when M=8, $N_1$=4, $N_2$=4, K=2, and $|\bar{u}_n^i|$=2, $\overline{H}^i = [\bar{h}^1{}_1 \ \bar{h}^1{}_2 \ \bar{h}^1{}_3 \ \bar{h}^1{}_4 \ \bar{h}^1{}_5 \ \bar{h}^1{}_6 \ \bar{h}^1{}_7 \ \bar{h}^1{}_8]$ is a 4×8 matrix, and two columns of $\overline{H}^1$, are not included in the FS layer and SS layer of $\overline{H}^1$. More specifically, through an FSD ordering, an ordered $\ddot{H}^1 = [\bar{h}^1{}_{u_1} \ \bar{h}^1{}_{u_2} \ldots \bar{h}^1{}_{u_8}]$ may be obtained. For example, $\overline{H}^1$ may be ordered to obtain $\ddot{H}^1 = [\bar{h}^1{}_3 \ \bar{h}^1{}_4 \ \bar{h}^1{}_1 \ \bar{h}^1{}_2 \ \bar{h}^1{}_6 \ \bar{h}^1{}_5 \ \bar{h}^1{}_8 \ \bar{h}^1{}_7]$. If only two columns are included in FS layers, then the two rightmost columns of FSD ordered effective channel matrix, the column 7 and the column 8 of $\overline{H}^1$, may be included in the FS layers based on the ordering of $[\overline{h}^1_3 \, \overline{h}^1_4 \, \overline{h}^1_1 \, \overline{h}^1_2 \, \overline{h}^1_6 \, \overline{h}^1_5 \, \overline{h}^1_8 \, \overline{h}^1_7]$. Then, $u_{FS}^1 = \{8, 7\}$ (See S610).

Further, a 4×4 matrix $H_1\hat{F}_1 = [\overline{h}^1_1 \, \overline{h}^1_2 \, \overline{h}^1_3 \, \overline{h}^1_4]$ may be ordered through an FSD ordering and ordered $\tilde{H}_1 = [\overline{h}^1_4 \, \overline{h}^1_1 \, \overline{h}^1_2 \, \overline{h}^1_3]$ may be obtained. If only one column is included in an FS layer of $\tilde{H}_1$, then the rightmost column of the FSD ordered $\tilde{H}_1$, the column 3 of $H_1\hat{F}_1$, may be included in the FS layer of $\tilde{H}_1$. Then, $u_{FS,1}^1 = \{3\}$, and $u_{SS,1}^1 = \{4, 1, 2\}$ (See S620). The column(s) of $\overline{H}^1$ corresponding to $u_{FS,1}^1$ may be positioned at the rightmost column(s) of reordered $\overline{H}^1$ as shown below.

According to operations S630 and S640, $\overline{H}^1$ may be determined as $\overline{H}^1 = [\overline{h}^1_4 \, \overline{h}^1_1 \, \overline{h}^1_2 \, \overline{h}^1_5 \, \overline{h}^1_7 \, \overline{h}^1_3]$, and the set of the modified FS layers of $\overline{H}^1$ is $\overline{u}_{FS}^1 = \{7, 3\} \subset (u_{FS}^1 \cup u_{FS,1}^1)$. The set of the modified SS layers is $\overline{u}_{SS}^1 = \{4, 1, 2, 5\} \supset u_{SS,1}^1 = \{4, 1, 2\}$. In this way, the FS layers of $\tilde{H}_1$ can be included in FS layers of joint detection FSD decoding process, which reduces error probability of the MU-MIMO joint detection using the FSD decoding. In addition, in this example, the number of FS layers is not three, unlike the example of FIG. 5, thereby reducing the complexity while providing quasi-ML performance. The columns removed from $\overline{H}^1$ may be included in a set $\overline{H}_{/n_s}^i = [\overline{h}^1_6 \, \overline{h}^1_8]$, which may be used for interference whitening, according to one or more exemplary embodiments.

In operation S650, a full rank matrix $\overline{D}^i$ may be calculated from the reordered $\overline{H}^i$ based on Cholesky Decomposition, e.g., Equation 13. Here, the extended full rank matrix $\overline{D}^i$ may be an upper triangular matrix. In some embodiments, the term $\sigma^2 I_M$ may be ignored, then $\overline{G}^i = \overline{H}^{iH} \overline{H}^i = \overline{D}^{iH} \overline{D}^i$ may be used. Further, since at least one column of $\overline{H}^i$ may be eliminated in configuring the reordered $\overline{H}^i$, $\overline{D}^i$ may have lower rank than an M×M matrix.

In operation S660, an FSD decoding may be performed using a joint detection scheme to obtain $\overline{\hat{s}}_{FSD}^i$. For example, the Equations 14-1, 14-2, and 14-3 may be used along with the Equation 13. However, $\overline{D}^i$ may have lower rank than an M×M matrix.

Figure 7:
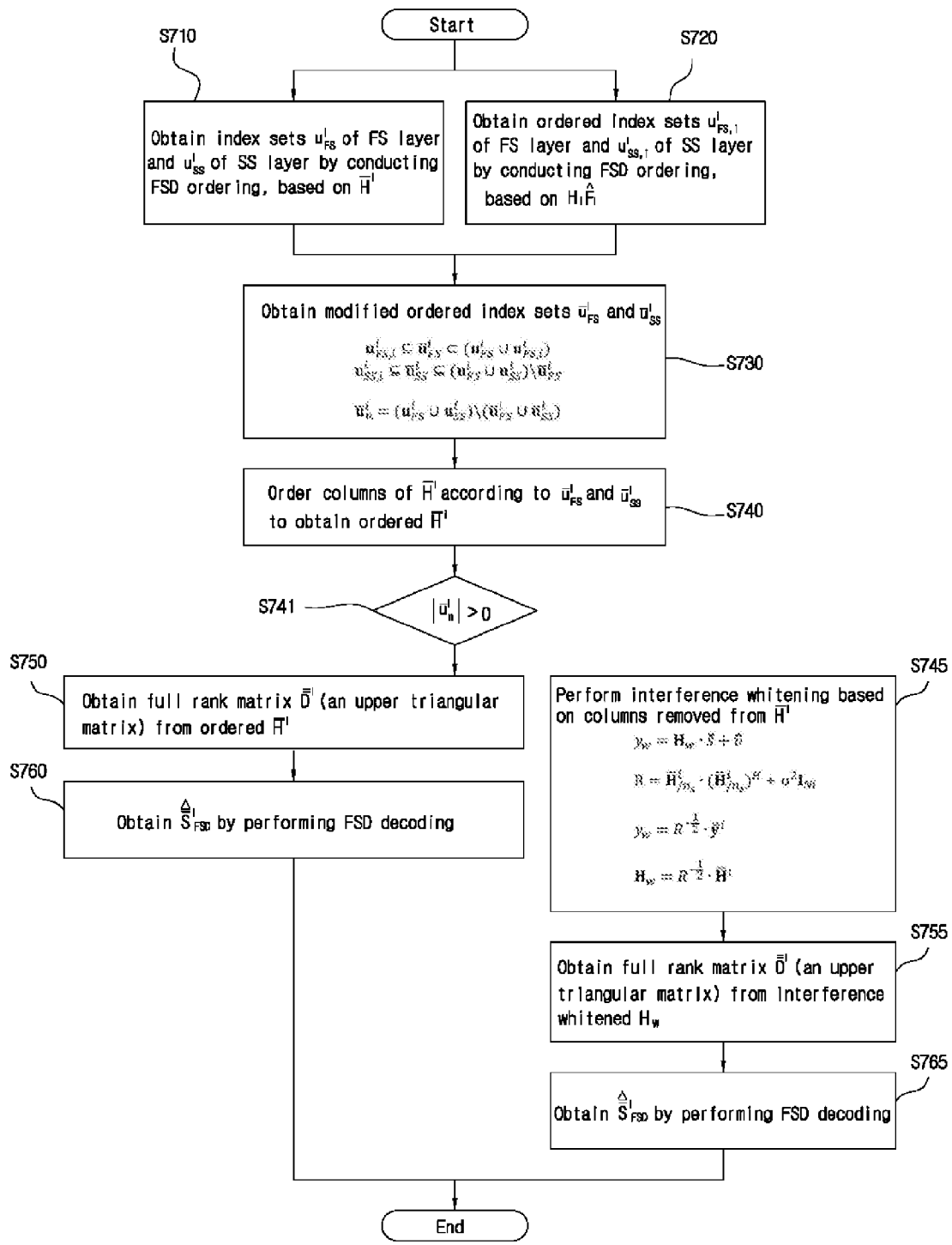
FIG. 7 is a flowchart illustrating of a process for modifying a fixed sphere decoding (FSD) ordering scheme, according to one or more exemplary embodiments.

FIG. 7 is a flowchart illustrating of a process for modifying a fixed sphere decoding (FSD) ordering scheme, according to one or more exemplary embodiments.

Referring to FIG. 7, in operation S710 (similar to the operation S510 of FIG. 5), by conducting FSD ordering using $\overline{H}^i$, the index set $u_{FS}^i$ of the FS layer of $\overset{..}{H}^i$ and the index set $u_{SS}^i$ of the SS layer of $\overset{..}{H}^i$ are obtained.

In operation S720 (similar to the operation S520 of FIG. 5), by conducting FSD ordering using $H_i\hat{F}_i$, the ordered index set $u_{FS,i}^i$ of the FS layer of $\tilde{H}_i$ and the ordered index set $u_{SS,i}^i$ of the SS layer of $\tilde{H}_i$ are obtained.

In operation S730, by using the ordered index set obtained previously, the modified ordered index set $\overline{u}_{FS}^i$ and $\overline{u}_{SS}^i$ are obtained using the following equations:

$u_{FS,i}^i \subseteq \overline{u}_{FS}^i \subset (u_{FS}^i \cup u_{FS,i}^i)$ $u_{SS,i}^i \subseteq \overline{u}_{SS}^i \subset (u_{FS}^i \cup u_{SS}^i) \setminus \overline{u}_{FS}^i$ $\overline{u}_n^i = (u_{FS}^i \cup u_{SS}^i) \setminus (\overline{u}_{FS}^i \cup \overline{u}_{SS}^i)$ Eq. 17

Consequently, the number of FS layers $l_{FS}^i$ and the number of SS layers $l_{SS}^i$ are obtained through the following conditions under which both $P_s(\hat{s}_{ML,i}^i \neq s_i)$ and $P_s(\hat{s}_{ML}^i \neq s)$ satisfy the quasi-ML performance:

$l_{FS}^i = |\overline{u}_{FS}^i|$ $l_{SS}^i = |\overline{u}_{SS}^i|$ Eq. 18 where $|\overline{u}_{FS}^i|$ is the number of elements of the set $\overline{u}_{FS}^i$, and $|\overline{u}_{SS}^i|$ is the number of elements of the set $\overline{u}_{SS}^i$. Unlike the embodiment of FIG. 5, $|\overline{u}_{FS}^i| + |\overline{u}_{SS}^i|$ may be smaller than M (or smaller than $\Sigma_{i=1}^K N^i$ when $\Sigma_{i=1}^K N_i \neq M$). For example, $|\overline{u}_{FS}^i| + |\overline{u}_{SS}^i|$ may be M$-|\overline{u}_n^i|$, where $|\overline{u}_n^i|$ is the number of elements of the set $\overline{u}_n^i$, and $\overline{u}_n^i = (u_{FS}^i \cup u_{SS}^i) \setminus (\overline{u}_{FS}^i \cup \overline{u}_{SS}^i)$.

In operation S740, $\overline{H}^i$ may be reordered according to $\overline{u}_{FS}^i$ and $\overline{u}_{SS}^i$. Accordingly, columns of the set $\overline{u}_{FS}^i$ are located on the right side of the columns of the set $\overline{u}_{SS}^i$. The modified effective channel matrix $\overline{H}^i$ by ordering columns of $\overline{H}^i$ can be obtained. The modified effective channel matrix $\overline{H}^i$ has differently ordered columns of $\overline{H}^i$, and adds, into the FS layer of $\overline{H}^i$, the column corresponding to the ordered index set $u_{FS,i}^i$ of the FS layer of $\tilde{H}^i$. Further, unlike the embodiment of FIG. 5, $\overline{H}^i$ may have fewer columns than $\overline{H}^i$ when ($|\overline{u}_n^i| > 0$).

In an example, when M=8, $N_1=4$, $N_2=4$, K=2, and $|\overline{u}_n^2|=2$ for i=2 (for the station having index i=2), $\overline{H}^2 = [\overline{h}^2_1 \, \overline{h}^2_2 \, \overline{h}^2_3 \, \overline{h}^2_4 \, \overline{h}^2_5 \, \overline{h}^2_6 \, \overline{h}^2_7 \, \overline{h}^2_8]$ is a 4×8 matrix, and two columns of $\overline{H}^2$, are not included in the FS layer and SS layer of $\overline{H}^2$. More specifically, through an FSD ordering, an ordered $\overset{..}{H}^2 = [\overline{h}^2_{u_1} \, \overline{h}^2_{u_2} \, \ldots \, \overline{h}^2_{u_8}]$ may be obtained. For example, $\overline{H}^2$ may be ordered to obtain $\overset{..}{H}^2 = [\overline{h}^2_6 \, \overline{h}^2_5 \, \overline{h}^2_8 \, \overline{h}^2_7 \, \overline{h}^2_3 \, \overline{h}^2_4 \, \overline{h}^2_1 \, \overline{h}^2_2]$. If only two columns are included in FS layers, then the two rightmost columns of FSD ordered effective channel matrix, the column 1 and the column 2 of $\overline{H}^2$, may be included in the FS layers based on the ordering of $[\overline{h}^2_6 \, \overline{h}^2_5 \, \overline{h}^2_8 \, \overline{h}^2_7 \, \overline{h}^2_3 \, \overline{h}^2_4 \, \overline{h}^2_1 \, \overline{h}^2_2]$. Then, $u_{FS}^1 = \{1,2\}$ (See S710).

Further, a 4×4 matrix $H_2\hat{F}_2 = [\overline{h}^2_5 \, \overline{h}^2_6 \, \overline{h}^2_7 \, \overline{h}^2_8]$ may be ordered through an FSD ordering and ordered $\tilde{H}_2 = [\overline{h}^2_5 \, \overline{h}^2_8 \, \overline{h}^2_7 \, \overline{h}^2_6]$ may be obtained. If only one column is included in an FS layer, then the rightmost column of the FSD ordered $\tilde{H}_2$, the column 6 of $H_2\hat{F}_2$, may be included in the FS layers. Then, $u_{FS,2}^2 = \{6\}$, and $u_{SS,2}^2 = \{5, 8, 7\}$ (See S720). The column(s) of $\overline{H}^2$ corresponding to $u_{FS,2}^2$ may be positioned at the rightmost column(s) of reordered $\overline{H}^2$ as shown below.

According to operations S730 and S740, $\overline{H}^2$ may be determined as $\overline{H}^2 = [\overline{h}^2_5 \, \overline{h}^2_8 \, \overline{h}^2_7 \, \overline{h}^2_4 \, \overline{h}^2_2 \, \overline{h}^2_6]$, and the set of the modified FS layers is $\overline{u}_{FS}^1 = \{2, 6\} \subset (u_{FS}^1 \cup u_{FS,2}^1)$. The set of the modified SS layers is $\overline{u}_{SS}^2 = \{5, 8, 7, 4\} \supset u_{SS,2}^2 = \{5, 8, 7\}$. In this way, the FS layers of $\tilde{H}_2$ can be included in FS layers of joint detection FSD decoding process, which reduces error probability of the MU-MIMO joint detection using the FSD decoding. In addition, in this example, the number of FS layers is not three, unlike the example of FIG. 5, thereby reducing the complexity while providing quasi-ML performance. The columns removed from $\overline{H}^2$ may be included in a set $\overline{H}_{/n_s}^2 = [\overline{h}^2_3 \, \overline{h}^2_1]$, which may be used for interference whitening, according to one or more exemplary embodiments.

In operation S741, it is determined whether $|\overline{u}_n^i| > 0$. If ($|\overline{u}_n^i| = 0$), operation S750 is performed. In the operation S750, a full rank matrix, $\overline{D}^i$, may be calculated from the reordered $\overline{H}^i$ based on Cholesky Decomposition, e.g., Equation 13. Here, the extended full rank matrix $\overline{D}^i$ may be an upper triangular matrix. In some embodiments, the term $\sigma^2 I_M$ may be ignored, then $\overline{G}^i = \overline{H}^{iH} \overline{H}^i = \overline{D}^{iH} \overline{D}^i$ may be used.

In operation S760, an FSD decoding may be performed using a joint detection scheme to obtain $\overline{\hat{s}}_{FSD}^i$. For example, the Equations 14-1, 14-2, and 14-3 may be used along with the Equation 13.

If ($|\overline{u}_n^i| > 0$), operation S745 is performed. In the operation S745, an interference whitening may be applied to interference components eliminated from the joint detection scheme, e.g., an interference whitening for $\overline{H}_{/n_s}^i$ including the columns removed from $\overline{H}^i$ when configuring $\overline{H}^i$. More specifically, if $|\bar{u}_n^i|=0$, operation S750 may be performed without an interference whitening process. If $|\bar{u}_n^i|>0$, $\overline{H}_{/n_2}^i$ may be determined to include columns removed from $\overline{H}^i$ when configuring $\overline{H}^i$.

In an example, an interference whitening may be performed using the following equations:

$$y_w = H_w \cdot \bar{s} + \bar{v} \quad \text{Eq. 19-1}$$

$$R = \overline{H}_{/n_s}^i \cdot (\overline{H}_{/n_s}^i)^H + \sigma^2 I_{Ni} \quad \text{Eq. 19-2}$$

$$y_w = R^{-\frac{1}{2}} \cdot \bar{\bar{y}}^i \quad \text{Eq. 19-3}$$

$$H_w = R^{-\frac{1}{2}} \cdot \bar{\bar{H}}^i \quad \text{Eq. 19-4}$$

If $|\bar{u}_n^i|=n$, total n columns are removed from $\overline{H}^i$ and $\overline{H}^i$ is an $N_i \times (M-n)$ matrix. $H_{/n_2}^i$ is an $N_i \times n$ matrix, R is an $N_i \times N_i$ matrix, $I_{Ni}$ is an $N_i \times N_i$ identity matrix, and $\sigma^2$ is defined above. Accordingly, $H_w$ is an $N_i \times (M-n)$ matrix, and each of $\bar{s}$ and $\bar{v}$ is an $1 \times (M-n)$ matrix.

In operation S755, an $(M-n) \times (M-n)$ full rank matrix, $\overline{D}^i$, may be calculated from the interference whitened $N_w(N_i \times M-n)$ based on Cholesky Decomposition, e.g., Equation 20 shown below:

$$\overline{G}^i = H_w^H H_w + \sigma^2 I_{M-n} = \overline{D}^{iH} \overline{D}^i \quad \text{Eq. 20}$$

Here, the extended full rank matrix $\overline{D}^i$ may be an upper triangular matrix. In some embodiments, the term, $\sigma^2 I_M$, may be ignored, then $\overline{G}^i = H_w^H H_w = \overline{D}^{iH} \overline{D}^i$ may be used.

In operation S765, an FSD decoding may be performed using a joint detection scheme to obtain $\hat{\bar{s}}_{FSD}^i$. For example, the following Equations may be used along with the Equation 20.

$$\hat{\bar{s}}_{FSD}^i = \mathrm{argmin}_{\bar{s} \in \hat{c}} \left\| \bar{y}^i - \overline{D}^i \bar{s} \right\|^2 \quad \text{Eq. 21-1}$$

$$= \mathrm{argmin}_{\bar{s} \in \hat{c}} \| y_w - H_w \bar{s} \|^2$$

$$= \mathrm{argmin}_{\bar{s} \in \hat{c}} \left\| \bar{\bar{y}}^i - \bar{\bar{H}}^i \bar{s} \right\|^2$$

$$\bar{y}^i = \overline{G}^{i-1} H_w^H y_w \text{ or} \quad \text{Eq. 21-2}$$

$$\bar{y}^i = H_w^\dagger y_w = (H_w^H H_w)^{-1} H_w^H y_w \quad \text{Eq. 21-3}$$

where $\bar{s}_{MLD}^i = \mathrm{argmin}_{\bar{s} \in \Omega} \|\bar{y}^i - \overline{H}^i \bar{s}\|^2$ (with ordering and removing at least one column from $\overline{H}^i$), $\hat{s}_{MLD}^i = \mathrm{argmin}_{\bar{s} \in \Omega} \|y_i - \overline{H}^i \bar{s}\|^2$ (before ordering), $\hat{S}$ is the restricted search space of $\Omega = \Pi_{i=1}^K \chi_{m_i}^{N_i}$, i.e., ($\hat{S} \subseteq \Omega$). Columns of $\bar{s}^T$ are ordered by ordering columns of $s^T$ and Columns of $\bar{y}^T$ are ordered by ordering columns of $y^T$, according to the modified column ordering of $\overline{H}^i$ from $\overline{H}^i$. The FSD under the joint detection scheme considerably reduces calculation complexity using the $\hat{S}$ defined by a node distribution vector of $n_S = (n_1, n_2, \ldots, n_M)$ instead of $\Omega$, and the entire search space of the MLD under the joint detection scheme.

Figure 8:
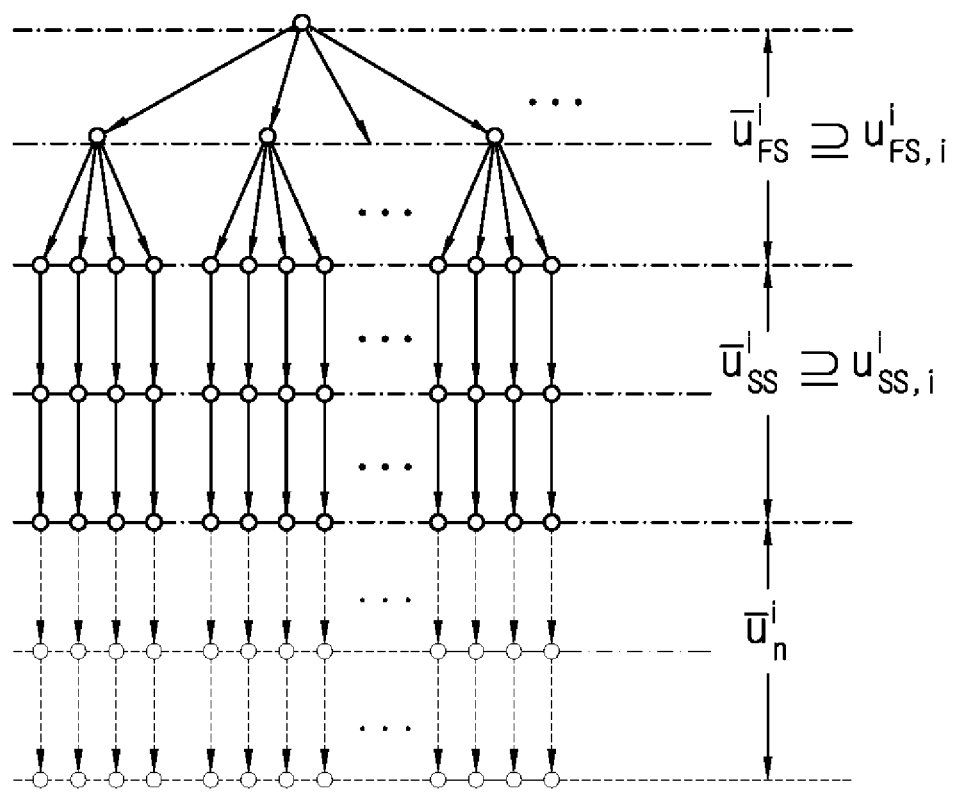
FIG. 8 is a diagram of an illustrative search tree of the i-th STA constituted by a modified FSD ordering scheme, according to one or more exemplary embodiments.

FIG. 8 is a diagram of an illustrative search tree of the i-th STA constituted by a modified FSD ordering scheme, according to one or more exemplary embodiments.

Referring to FIG. 8, the search tree of the i-th STA constituted by the modified FSD ordering scheme. Normally, the strength of the interference streams is lower than that of the desired signal stream. Therefore, these interference streams are distributed at the top and bottom layers of the search tree. Although not illustrated in FIG. 8, the column(s) of the set $u_{FS,i}^i$ may be located on the right side of the column(s) of the set $u_{FS}^i$ such that the full search for the column(s) of the set $u_{FS,i}^i$ is located upper location of the search tree than the full search for the column(s) of the set $u_{FS}^i$, according to one or more exemplary embodiments.

Further, according to one or more exemplary embodiments, at least one column of the set $u_{FS}^i$ may be included in the SS layers or may belong to columns corresponding to $\bar{u}_n^i$ because at least one of the column(s) of the set $u_{FS,i}^i$ is added into the FS layers. Thus, the total number of FS layer may not be increased even though the column(s) of the set $u_{FS,i}^i$ is added into the FS layers.

Figure 9:
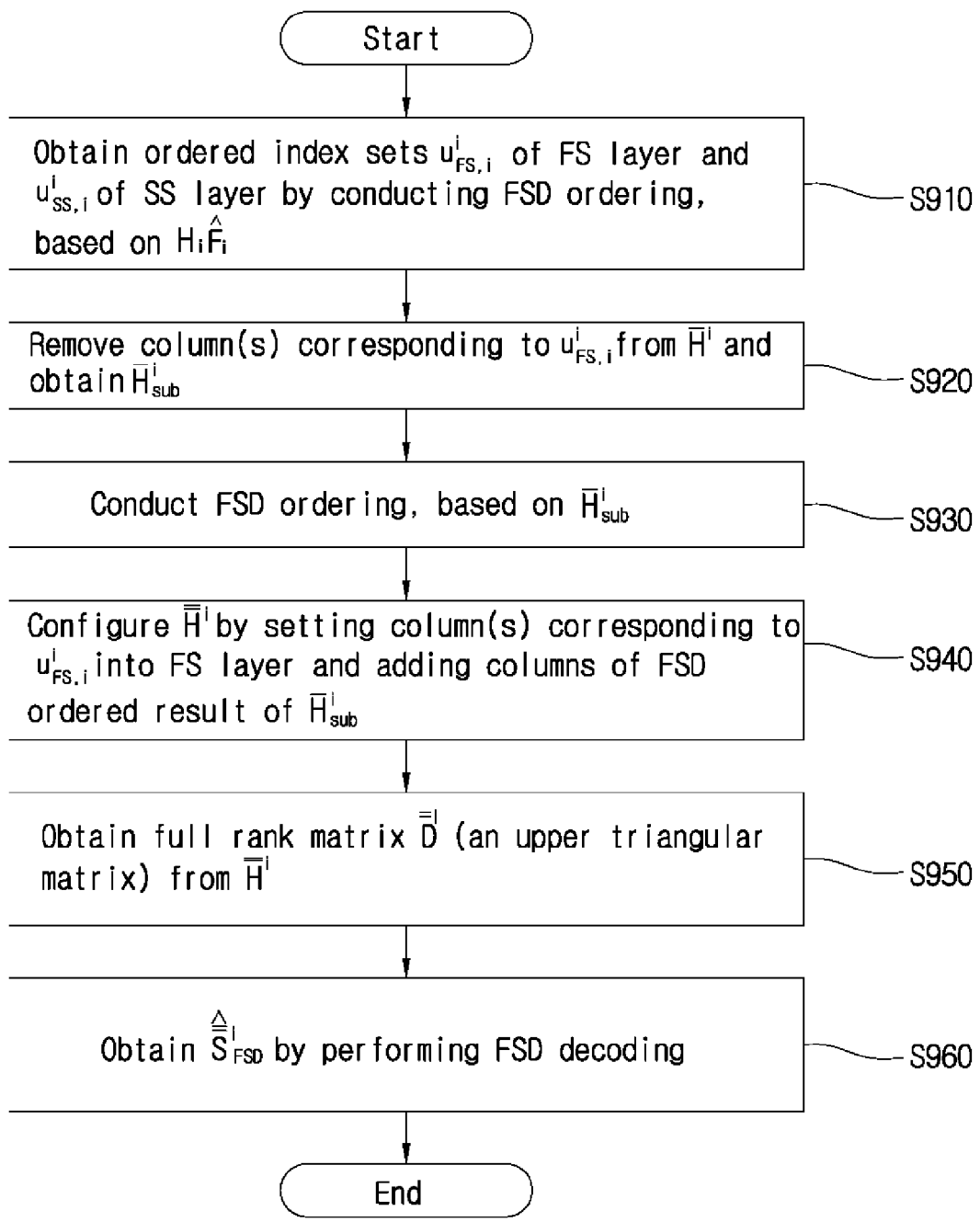
FIG. 9 is a flowchart illustrating of a process for modifying a fixed sphere decoding (FSD) ordering scheme, according to one or more exemplary embodiments.

FIG. 9 is a flowchart illustrating of a process for modifying a fixed sphere decoding (FSD) ordering scheme, according to one or more exemplary embodiments.

Referring to FIG. 9, in operation S910, by conducting FSD ordering using $H_i\hat{F}_i$, which is the product of the channel matrix of $STA_i$ ($H_i$) and the estimate of steering matrix of $STA_i$ ($\hat{F}_i$) the ordered index set $u_{FS,i}^i$ of the FS layer of $\tilde{H}_i$ and the ordered index set $u_{SS,i}^i$ of the SS layer of $\tilde{H}_i$ are obtained. For example, when $M=12$, $N_1=4$, $N_2=4$, $N_3=4$, $K=3$, and $i=2$, $\overline{H}^2 = [\bar{h}^2_1 \ \bar{h}^2_2 \ \bar{h}^2_3 \ \bar{h}^2_4 \ \bar{h}^2_5 \ \bar{h}^2_6 \ \bar{h}^2_7 \ \bar{h}^2_8 \ \bar{h}^2_9 \ \bar{h}^2_{10} \ \bar{h}^2_{11} \ \bar{h}^2_{12}]$, which is the effective channel matrix of $STA_2$ $$H_2 \hat{F}_1 = [\bar{h}^2_1 \ \bar{h}^2_2 \ \bar{h}^2_3 \ \bar{h}^2_4]$$

$$H_2 \hat{F}_2 = [\bar{h}^2_5 \ \bar{h}^2_6 \ \bar{h}^2_7 \ \bar{h}^2_8]$$

$$H_2 \hat{F}_3 = [\bar{h}^2_9 \ \bar{h}^2_{10} \ \bar{h}^2_{11} \ \bar{h}^2_{12}]$$

If the FSD ordering result of $H_i\hat{F}_i$ for i=2, based on e.g., the Equation 8, is $[\bar{h}^2_8 \ \bar{h}^2_5 \ \bar{h}^2_6 \ \bar{h}^2_7]$, then at least the column $\bar{h}^2_7$ belongs to the FS layer of $H_i\hat{F}_i$ and corresponds to the index set $u_{FS,i}^i$ (the number of FS layers is greater than or equal to 1 because $N_2=4$ and the equation $\lceil \sqrt{N_i}-1 \rceil$). The index set $u_{FS,i}^i$ is index set of FS layer columns of a matrix obtained based on an FSD ordering of $H_i\hat{F}_i$. The index set $u_{SS,i}^i$ is index set of SS layer columns of the matrix obtained based on the FSD ordering of $H_i\hat{F}_i$.

In operation S920, column(s) corresponding to the index set $u_{FS,i}^i$ may be removed from $\overline{H}^i$ and $\overline{H}_{sub}^i$ may be obtained by the removal. From the above example, when only $\bar{h}^2_7$ belongs to the FS layer of $H_i\hat{F}_i$, $\overline{H}_{sub}^i = [\bar{h}^2_1 \ \bar{h}^2_2 \ \bar{h}^2_3 \ \bar{h}^2_4 \ \bar{h}^2_5 \ \bar{h}^2_6 \ \bar{h}^2_8 \ \bar{h}^2_9 \ \bar{h}^2_{10} \ \bar{h}^2_{11} \ \bar{h}^2_{12}]$. In another example, when the two rightmost columns $[\bar{h}^2_6 \ \bar{h}^2_7]$ of the FSD ordering result of for $H_i\hat{F}_i$ for i=2 belong to the FS layer of $H_i\hat{F}_i$ and correspond to the index set $u_{FS,i}^i$, then $\overline{H}_{sub}^i = [\bar{h}^2_1 \ \bar{h}^2_2 \ \bar{h}^2_3 \ \bar{h}^2_4 \ \bar{h}^2_5 \ \bar{h}^2_8 \ \bar{h}^2_9 \ \bar{h}^2_{10} \ \bar{h}^2_{11} \ \bar{h}^2_{12}]$.

In operation S930, an FSD ordering is conducted based on $\overline{H}_{sub}^i$. For example, when u is the index vector used to the FSD ordering, it can be determined in every iteration according to the following, for $k=M-|u_{FS,i}^i|, M-|u_{FS,i}^i|-1, \ldots, 1$. $|u_{FS,i}^i|$ the number of elements in $u_{FS,i}^i$.

A) When, the k+1th index element of u, $u_{k+1}$ is obtained through the previous repetition process and $$\overline{H}_{sub(u_{k+1})}^i$$

is the matrix in which columns of $u_{k+1}$ selected through the previous repetition process are replaced with zero column vector, $$\overline{H}^i_{sub(u_{k+1})}{}^\dagger = \left(\overline{H}^i_{sub(u_{k+1})}{}^H \overline{H}^i_{sub(u_{k+1})}\right)^{-1} \overline{H}^i_{sub(u_{k+1})}{}^H$$

is calculated.
(B) When $$\left(\overline{H}^i_{sub(u_{k+1})}{}^\dagger\right)_j \text{ is the } j^{th} \text{ row of } \overline{H}^i_{sub(u_{k+1})}{}^\dagger$$

with $j\in[1, M-|u_{FS,i}^i|]-\{u_{k+1}\}$, the index $u_k$ is calculated through Equation 22.

$$u_k = \begin{cases} \operatorname{argmax}_j \left\|\overline{H}^i_{sub(u_{k+1})}{}^\dagger{}_j\right\|^2, & \text{if } n_k = m_i \\ \operatorname{argmax}_j \left\|\overline{H}^i_{sub(u_{k+1})}{}^\dagger{}_j\right\|^2, & \text{if } n_k \neq m_i \end{cases} \quad \text{Eq. 22}$$

where $$\overline{H}^i_{sub}\left(u_{M-|u_{FS,i}^i|+1}\right) = \overline{H}^i_{sub}$$

for initial condition.

Using the index vector u, the ordered channel matrix $\ddot{H}_{sub}^i$ by ordering columns of $\overline{H}_{sub}^i$ can be obtained as below:

$$\ddot{H}_{sub}^i = \begin{bmatrix} \overline{h}^i_{u_1} & \overline{h}^i_{u_2} & \cdots & \overline{h}^i_{u_{M-|u_{FS,i}^i|}} \end{bmatrix} \quad \text{Eq. 23}$$

where $\overline{h}^i_{u_k}$ is $u_k$th column vector of $\overline{H}_{sub}^i$.

From the ordered $\ddot{H}_{sub}^i$, columns that are larger than $\lceil\sqrt{M}-|u_{FS,i}^i|-1\rceil$ from the rightmost column of $\ddot{H}_{sub}^i$ may be included in the full search (FS) layers. For example, if M is 12 and $|u_{FS,i}^i|=1$ (when only $\overline{h}^2_7$ belongs to the FS layer of $H_i\hat{F}_i$ for i=2 in the above example), at least two rightmost columns are included in the FS layers ($\lceil\sqrt{12}-1-1\rceil=2$). The index set $u_{FS}^i$ of the FS layer may be obtained from the at least two columns, $$\overline{h}^i_{u_{M-|u_{FS,i}^i|}}, \text{ and } \overline{h}^i_{u_{M-|u_{FS,i}^i|-1}},$$

and the index set $u_{SS}^i$ of the SS layer may be obtained from the rest columns other than the at least two columns, $$\overline{h}^i_{u_{M-|u_{FS,i}^i|}}, \text{ and } \overline{h}^i_{u_{M-|u_{FS,i}^i|-1}}.$$

In another example, from the ordered $\ddot{H}_{sub}^i$, columns that are larger than $\lceil\sqrt{M-|u_{FS,i}^i|}-1\rceil$ from the rightmost column of $\ddot{H}_{sub}^i$ may be included in the full search (FS) layers. If M is 12 and $|u_{FS,i}^i|=1$ (when only $\overline{h}^2_7$ belongs to the FS layer of $H_i\hat{F}_i$ for i=2 in the above example), at least three rightmost columns are included in the FS layers ($\lceil\sqrt{12-1}-1\rceil=3$). The index set $u_{FS}^i$ of the FS layer may be obtained from the at least three columns $$\overline{h}^i_{u_{M-|u_{FS,i}^i|}}, \overline{h}^i_{u_{M-|u_{FS,i}^i|-1}}, \text{ and } \overline{h}^i_{u_{M-|u_{FS,i}^i|-2}},$$

and the index set $u_{SS}^i$ of the SS layer may be obtained from the rest columns other than the at least three columns, $$\overline{h}^i_{u_{M-|u_{FS,i}^i|}}, \overline{h}^i_{u_{M-|u_{FS,i}^i|-2}}, \text{ and } \overline{h}^i_{u_{M-|u_{FS,i}^i|-3}}.$$

In operation S940, $\overline{\overline{H}}^i$ may be configured by setting column(s) corresponding to $u_{FS,i}^i$ into FS layers and adding columns of $\ddot{H}_{sub}^i$, the FSD ordered result of $\overline{H}_{sub}^i$. For example, when the two rightmost columns $[\overline{h}^2_6 \; \overline{h}^2_7]$ of the FSD ordering result of $H_i\hat{F}_i$ for i=2 belong to the FS layer of $H_i\hat{F}_i$ and correspond to the index set $u_{FS,i}^i$, then $\overline{\overline{H}}^2 = [\overline{h}^2_{u_1} \; \overline{h}^2_{u_2} \ldots \overline{h}^2_{u_{20}} \; \overline{h}^2_6 \; \overline{h}^2_7]$ for i=2, where $\ddot{H}_{sub}^2 = [\overline{h}^2_{u_1} \; \overline{h}^2_{u_2} \ldots \overline{h}^2_{u_{10}}]$. Among columns of $\overline{\overline{H}}^2$, at least three columns $\overline{h}^2_{u_{10}} \; \overline{h}^2_6 \; \overline{h}^2_7$ belong to FS layers of $\overline{\overline{H}}^2$ according to e.g., the equation $\lceil\sqrt{M}-1\rceil$.

In operation S950 (similar to the operation S550), an M×M full rank matrix $\overline{\overline{D}}^i$ may be calculated from the reordered $\overline{\overline{H}}^i(N_i \times M)$ based on Cholesky Decomposition, e.g., Equation 13.

In operation S960 (similar to the operation S560), an FSD decoding may be performed using a joint detection scheme to obtain $\overline{\overline{s}}_{FSD}^i$. For example, the Equations 13, 14-1, 14-2, and 14-3 may be used.

Fixed-Complexity Sphere Decoding Algorithm

In order to obtain $\overline{\overline{s}}_{FSD}^i$ using FSD decoding under the joint detection scheme, the conventional Zero Forcing decoding may be used for SS layers or other known sphere decoding algorithms. The main idea behind the Fixed-complexity sphere (FSD) is to perform a search over only a fixed number of lattice vectors Hs, generated by a small subset $\mathcal{S} \subset X_m^M$, around the received vector y. The transmitted vector $s \in \mathcal{S}$ with the smallest Euclidean distance is then selected as the solution. The process can be written as $$\hat{s}_{FSD} = \operatorname*{argmin}_{s \in \mathcal{S}} |y - Hs|^2$$
$$= \operatorname*{argmin}_{s \in \mathcal{S}} |R(s - \hat{s}_{ZF})|^2$$

where R is an N×N upper triangular matrix, with entries denoted $r_{ij}$, obtained through QR decomposition of the channel matrix H and $\hat{s}_{ZF} = R^{-1}Q^T y$, is the unconstrained ML estimate of s.

The (squared) Euclidean distance in the following equations can be obtained recursively starting from i=N and working backwards until i=1 using $$w_i = r_{ii}^2 |s_i - z_i|^2 + \sum_{j=i+1}^{M} r_{ii}^2 |s_i - z_i|^2 = e_i + w_{i+1}$$

where $w_{N+1} = 0$, $w_1 = \|R(s - \hat{s}_{ZF})\|^2$ and $$z_i = \hat{s}_{ZF,i} - \sum_{j=i+1}^{M} \frac{r_{ij}}{r_{ii}} (s_j - \hat{s}_{ZF,j})$$

The term $w_{i+1}$ can be seen as an APED down to level $j=i+1$ and the term $e_i$ as the PED contribution from level i.

Figure 10:
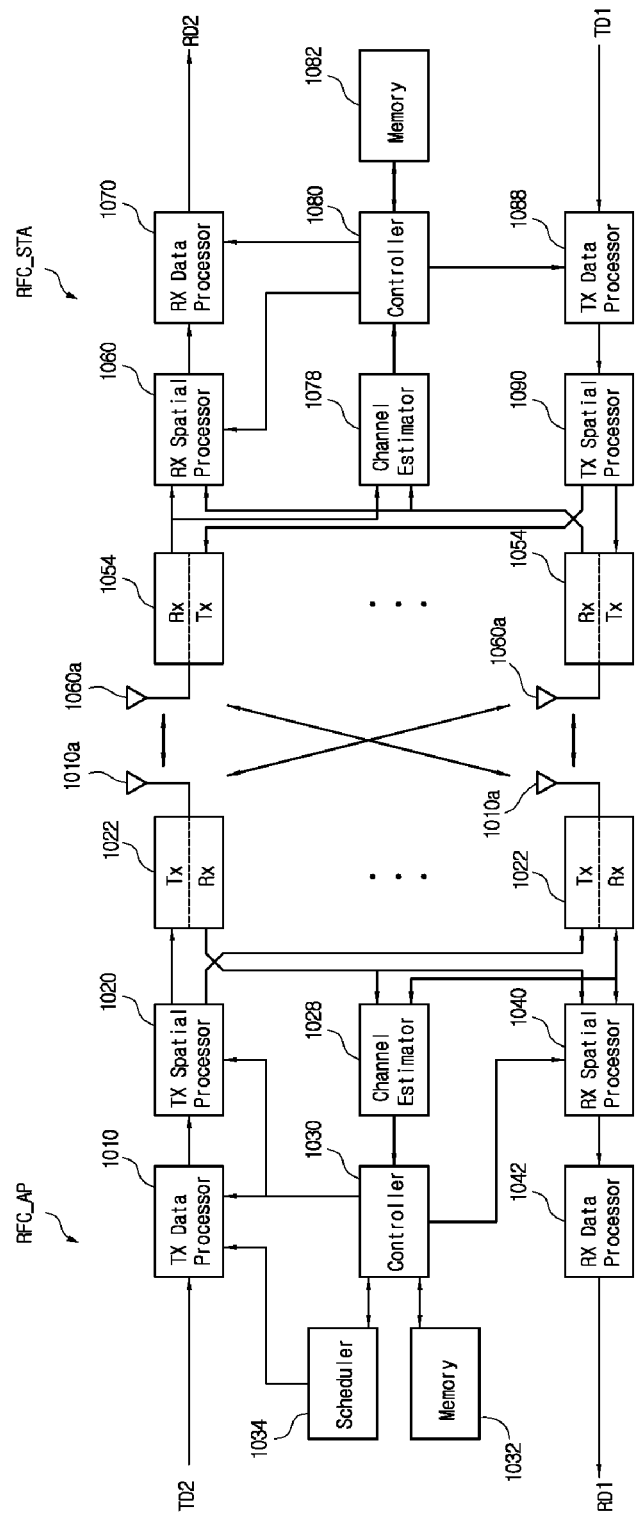
FIG. 10 is a diagram illustrating a radio frequency communication (RFC) module in an access point and an RFC module in a user station in a MIMO system, according to one or more exemplary embodiments.

FIG. 10 is a diagram illustrating a radio frequency communication (RFC) module in an access point and an RFC module in a user station in a MIMO system, according to one or more exemplary embodiments.

The RFC module in the access point RFC_AP may be connected to, or may have, M antennas 1010a through 1010b. The RFC module in the user station RFC_STA may be connected to, or may have, Ni antennas 1060a through 1060b. The access point is a transmitting device for the downlink and a receiving device for the uplink. The user station is a transmitting device for the uplink and a receiving device for the downlink. A plurality of user stations including the user station may be selected from simultaneous transmission on the downlink or uplink. The beam-steering or some other spatial processing technique may be employed at the access point and the user station.

According to one or more exemplary embodiments, on the uplink, at the user station selected for uplink transmission, a TX data processor 1088 receives traffic data from a data source TD1 and control data from a controller 1080. The controller 1080 may store data in a memory 1082. TX data processor 1088 processes (e.g., encodes, interleaves, and modulates) the traffic data for the user station based on the coding and modulation schemes associated with the rate selected for the user station and provides a data symbol stream. A TX spatial processor 1090 performs spatial processing on the data symbol stream and provides transmit symbol streams for the antennas. Each transmitter unit (TX) 1054 receives and processes (e.g., converts to analog, amplifies, filters, and frequency upconverts) a respective transmit symbol stream to generate an uplink signal. Transmitter units 1054 provide uplink signals for transmission from antennas 1060a through 1060b to the access point.

At access point, antennas 1010a through 1010b receive the uplink signals from all selected user stations transmitting on the uplink. Each antenna 1010a through 1010b provides a received signal to a respective receiver unit (RX) 1022. Each receiver unit 1022 performs processing complementary to that performed by transmitter unit 1054 and provides a received symbol stream. An RX spatial processor 1040 performs receiver spatial processing on the received symbol streams from receiver units 1022 and provides recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream is an estimate of a data symbol stream transmitted by a respective user station. An RX data processor 1042 processes (e.g., demodulates, deinterleaves, and decodes) each recovered uplink data symbol stream in accordance with the rate used for that stream to obtain decoded data. The decoded data for each user station may be provided for storage and/or to a controller 1030 for further processing. The controller 1030 may store data in a memory 1032.

According to one or more exemplary embodiments, on the downlink, at access point, a TX data processor 1010 receives traffic data from a data source TD2 for user stations scheduled for downlink transmission, control data from a controller 1030 and possibly other data from a scheduler 1034. The various types of data may be sent on different transport channels. TX data processor 1010 processes (e.g., encodes, interleaves, and modulates) the traffic data for each user station based on the rate selected for that user station. TX data processor 1010 provides downlink data symbol streams for the user stations. A TX spatial processor 1020 performs spatial processing on the downlink data symbol streams, and provides transmit symbol streams for the antennas 1010a through 1010b. Each transmitter unit (TMTR) 1022 receives and processes a respective transmit symbol stream to generate a downlink signal. Transmitter units 1022 provide downlink signals for transmission from antennas 1010a through 1010b to the user stations.

At each user station, antennas 1060a through 1060b receive the downlink signals from access point. Each receiver unit (RX) 1054 processes a received signal from an associated antenna 1060a through 1060b and provides a received symbol stream. An RX spatial processor 1060 performs receiver spatial processing on received symbol streams from receiver units 1054 and provides a recovered downlink data symbol stream for the user station. The receiver spatial processing is performed in accordance with the CCMI, MMSE, or some other technique. An RX data processor 1070 processes (e.g., demodulates, deinterleaves, and decodes) the recovered downlink data symbol stream to obtain decoded data for the user station.

The user station includes a fixed-complexity sphere decoder (FSD) configured to modify FSD ordering described above and to perform FSD processing. At least part of the functions and operations of the FSD illustrated herein may be performed by the RX spatial processor 1060, the RX data processor 1070, or another hardware block associated with at least one of the RX spatial processor 1060 and the RX data processor 1070. Further, the FSD may be configured as one or more logic circuits configured in the RFC module in the user station RFC_STA.

A channel estimation between the access point and selected user stations may be performed based on a signal transmission from the access point to the selected user stations and feedbacks from the selected user stations to the access point. Based on the communication between the access point and the selected user stations, a channel estimator 1028 of the access point and a channel estimator 1078 of each of the selected user stations may perform channel estimation operations. For example, the compressed beamforming procedure may be performed and each station may transmit feedback information to the access point. Based on the feedbacks of the user stations, the access point determines the estimate of the steering matrix of the user stations $\hat{F}=[\hat{F}_i \ \hat{F}_h]$. Then, each station estimates $\overline{H}_i$ based on a signal transmitted from the access point using the estimate of the steering matrix of the user stations $\hat{F}$.

Figure 11:
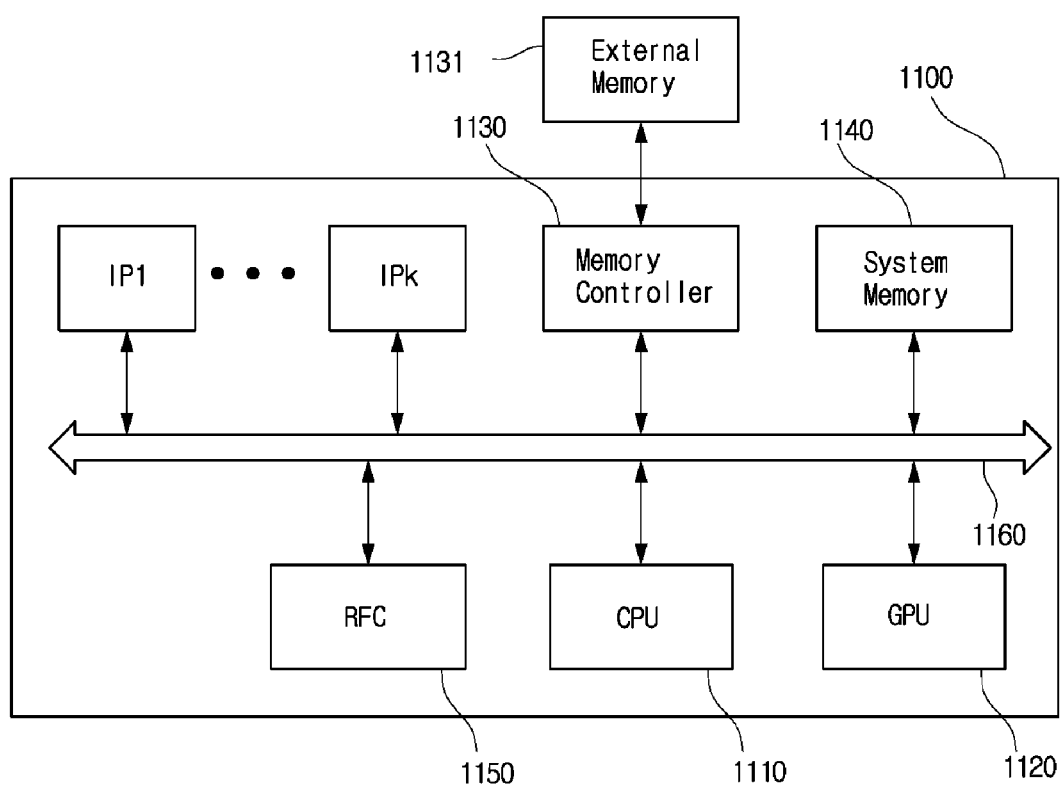
FIG. 11 is a block diagram of a system-on-chip (SoC) including radio frequency communication module, according to one exemplary embodiments.

FIG. 11 is a block diagram of a system-on-chip (SoC) including radio frequency communication module, according to one exemplary embodiments.

Referring to FIG. 11, the SoC 1100, e.g., an application processor, may include central processing unit (CPU) 1110, graphic processing unit (GPU) 1120, memory controller 1130, system memory 1140, radio frequency communication (RFC) module 1150, bus 1160, and first to k-th intellectual property (IP) blocks $IP_1$ to $IP_k$.

The CPU 1110 may include a microprocessor including hardware, software, and/or firmware, which processes various tasks and operates an operating system (OS) and application programs. The CPU 1110 may include a plurality of processing cores and a cache memory. The CPU 1110 may control the GPU 1120, the memory controller 1130, the system memory 1140, the radio frequency communication module 1150, and the first to k-th IP blocks $IP_1$ to $IP_k$ through the bus 1160.

According to one or more exemplary embodiments, the GPU 1120 may be coupled to the bus 1160 and may be configured to handle one or more processes (e.g., a series and/or simultaneous processes) in response to a control signal of the CPU 1110. For example, the GPU 1120 performs a video data processing. The GPU 1120 may be configured to handle one or more threads associated with video data processing, which may be performed via single threading or multithreading configuration. The GPU 1120 may include a control unit configured to calculate (or otherwise determine) and compare graphic-related data. The GPU 1120 may also be configured to analyze and execute a command(s) on behalf of the CPU 1110.

The SoC 1100 may be coupled to the external memory 1131 through a memory controller 1130 included in the SoC 1100. However, the external memory 1131 may be integrated as part of the SoC 1100. Data processed by the CPU 1110, the GPU 1120, the radio frequency communication module 1150, and the first to k-th IP blocks $IP_1$ to $IP_k$ may be stored in the external memory 1131. The external memory 1131 may be controlled through the memory controller 1130. The external memory 1131 may include at least one of Static RAM (SRAM), Dynamic RAM (DRAM), and Synchronous DRAM (SDRAM), etc.; however, aspects of external memory 1131 are not limited thereto. Any suitable storage device (or repository) may be coupled to the SoC 1100 through any suitable I/O interface (not shown), which may be wired or wireless.

The system memory 1140 may be used as a working memory of the SoC 1100. The system memory 1140 may include at least one of Static RAM (SRAM), Dynamic RAM (DRAM), Synchronous DRAM (SDRAM), etc.

The radio frequency communication module 1150 may modify FSD ordering described above and perform FSD processing. The radio frequency communication module 1150 may be provided as the radio frequency communication module RFC_STA described with reference to FIG. 10. The radio frequency communication module 1150 may receive downlink signals via the antennas 1060a through 1060b (refer to FIG. 10), modify FSD ordering described above, and perform FSD processing for the downlink signals.

The IP blocks $IP_1$ to $IP_k$ may be SoC components configured to perform various functions and operations in the SoC 1100. Each of the IP blocks $IP_1$ to $IP_k$ may be classified into a master IP block or a slave IP block. It is also contemplated that the master IP block may serve as the slave IP block, or vice versa.

Figure 12:
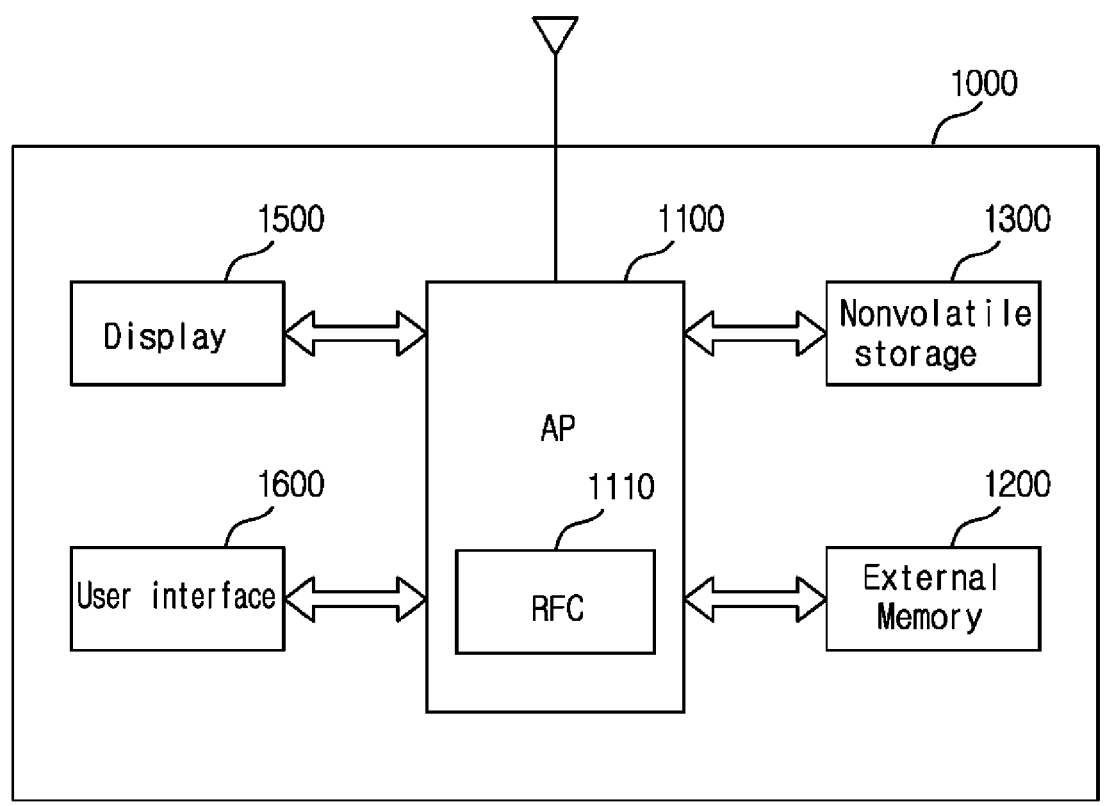
FIG. 12 is a block diagram illustrating a mobile station including an application processor, according to one or more exemplary embodiments.

FIG. 12 is a block diagram illustrating a mobile station including an application processor, according to one or more exemplary embodiments. For example, the application processor may be the SoC 1100 illustrated in FIG. 11 or a variation thereof.

Referring to FIG. 12, mobile station 1200 includes application processor 1100, external memory 1200, nonvolatile storage 1300, display 1500, and user interface 1600.

The application processor 1100 may control overall operations of the external memory 1200, the nonvolatile storage 1300, the display 1500, and the user interface 1600. The application processor 1100 may be provided as the SoC 1100 shown in FIG. 11, according to one or more exemplary embodiments. The application processor 1100 includes the radio frequency communication module 1110 coupled to antennas.

The external memory 1200 can be used as the external memory 1131 shown in FIG. 11. The External memory 1200 may store data processed by the application processor 1100 and data inputted through the user interface 1600. The external memory 1200 may include at least one of a static random-access memory (SRAM), a magnetoresistive random-access memory (MRAM), an embedded dynamic RAM (embedded DRAM), etc.; however, aspects of external memory 1200 are not limited thereto.

The nonvolatile storage 1300 includes various types of storages which retain stored data regardless power on/off conditions. For example, the nonvolatile storage 1300 includes at least one of various types such as a flash memory, a hard disk, a Read Only Memory (ROM), a Programmable ROM (PROM), an Electrically Programmable ROM (EPROM), an Electrically Erasable and Programmable ROM (EEPROM), a Phase-change RAM (PRAM), a Magnetic RAM (MRAM), a Resistive RAM (RRAM), a Ferroelectric RAM (FRAM). The nonvolatile storage 1300 may operate in response to a control of the application processor 1100. The memory controller 1130 shown in FIG. 11 may further include an interface for controlling the nonvolatile storage 1300.

The display 1500 displays information which is processed in mobile station 1000, according to a control of application processor 1100. One of the IP blocks in the application processor (AP) 1100 may be provided as a display controller coupled to the display 1500.

User interface 1600 detects a user input for controlling an operation of mobile station 1000, and generates corresponding input data. User interface 1600 may include an input device detecting a command or information from the user, such as a key pad, a mouse, a finger scan sensor, a dome switch, a touchpad, a jog wheel, and the like.

The RFC module 1110 may include at least one of Wireless Local Area Network (WLAN) communication module conforming to e.g., IEEE 802.11, and a cellular mobile communication module conforming to e.g., LTE, LTE-A, etc.

Figure 13:
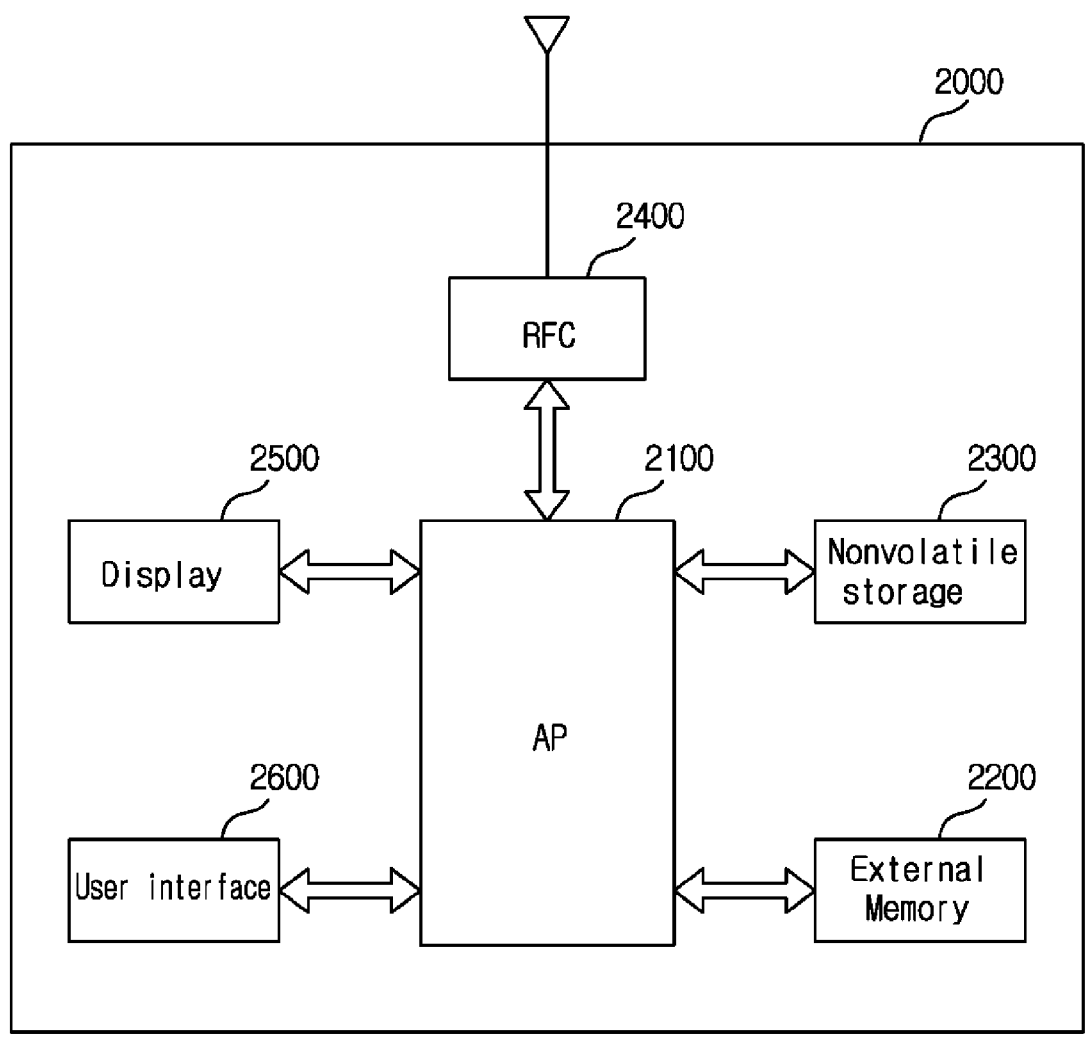
FIG. 13 is a block diagram illustrating a mobile station including an application processor, according to one or more exemplary embodiments.

FIG. 13 is a block diagram illustrating a mobile station including an application processor, according to one or more exemplary embodiments.

Referring to FIG. 13, the mobile station 2000 includes application processor (AP) 2100, external memory 2200, nonvolatile storage 2300, radio frequency communication (RFC) module 2600, display 2500, and user interface 2600.

The radio frequency communication RFC module 2600 may be provided as an external component for the application processor 2100, and may be implemented in an RFC chip. The radio frequency communication module 2600 may be coupled to the application processor 2100 through a communication interface for interfacing between the application processor 2100 and the radio frequency communication module 2600. One of the IP blocks in the AP 2100 may be provided as the communication interface. The RFC module 2600 may include at least one of Wireless Local Area Network (WLAN) communication module conforming to e.g., IEEE 802.11, and a cellular mobile communication module conforming to e.g., LTE, LTE-A, etc.

The RFC module 1110 included in the AP 1100 of FIG. 12 or the RFC module included in the RFC chip 2600 of FIG. 13 may perform fixed-complexity sphere decoding illustrated herein. The fixed-complexity sphere decoding may be applicable for DL MU-MIMO wireless signal conforming to various standards, such as IEEE 802.11, LTE, LTE-A, etc.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A method of a radio frequency communication (RFC) chip for a station, the RFC chip comprising a wireless local area network (WLAN) communication module to decode a downlink (DL) multi-user multiple-input multiple-output (MU-MIMO) wireless signal, the method comprising:
   determining a full search (FS) layer column based on a product of a channel matrix of the station and an estimate of a steering matrix of the station;
   ordering columns of a sub-matrix of an effective channel matrix of the station to determine one or more single search (SS) layer columns from the sub-matrix, the sub-matrix being determined by removing, from the effective channel matrix, a column corresponding to the determined FS layer column;
   configuring a modified effective channel matrix based on the determined FS layer column and the ordered columns of the sub-matrix, the determined FS layer column being determined as an FS layer column of the modified effective channel matrix; and
   determining a symbol of the station based on the modified effective channel matrix.

2. The method of claim 1, wherein:
   the effective channel matrix of the station is a product of the channel matrix of the station and an estimate of a steering matrix associated with a plurality of stations, the plurality of stations comprising the station; and
   ordering columns of the sub-matrix of the effective channel matrix of the station comprises: ordering, based on a comparison associated with magnitudes of the columns of the sub-matrix, the columns of the sub-matrix after removing the column corresponding to the determined FS layer column, the ordered columns of the sub-matrix each being classified into an FS layer column of the modified effective channel matrix or an SS layer column of the modified effective channel matrix.

3. The method of claim 2, wherein:
   the station is one of the plurality of stations to receive the DL MU-MIMO wireless signal associated with symbols for the plurality of stations; and
   the effective channel matrix $\overline{H}^i$ of the station corresponds to $\overline{H}^i = H_i\hat{F} = H_i[\hat{F}_1 \ldots \hat{F}_{i-1}\ \hat{F}_i\ \hat{F}_{i+1} \ldots \hat{F}_K]$, where K is a number of the plurality of stations, $H_i$ corresponds to the channel matrix of the station, and $\hat{F}_i$ corresponds to the estimate of the steering matrix of the station.

4. The method of claim 2, wherein a number of FS layer columns of the modified effective channel matrix is greater than or equal to $\lceil \sqrt{M}-1 \rceil$, where M is a total number of reception antennas of the plurality of stations.

5. The method of claim 1, wherein determining the symbol of the station comprises:
   determining a full rank matrix based on the modified effective channel matrix, where the full rank matrix is an M×M full rank matrix, and M is a total number of reception antennas of a plurality of stations comprising the station; and
   obtaining the symbol of the station based on the full rank matrix,
   wherein the DL MU-MIMO wireless signal is associated with symbols for the plurality of stations.

6. The method of claim 1, wherein a number of FS layer columns of the product is greater than or equal to $\lceil \sqrt{N_i}-1 \rceil$, where N is a total number of reception antennas of the station.

7. The method of claim 1, wherein:
   the effective channel matrix of the station is a product of the channel matrix of the station and an estimate of a steering matrix associated with a plurality of stations, the plurality of stations comprising the station;
   the station is one of the plurality of stations to receive the DL MU-MIMO wireless signal associated with symbols for the plurality of stations; and
   ordering the columns of the sub-matrix comprises: determining an index vector used for a fixed-complexity sphere decoder (FSD) ordering scheme for the sub-matrix, based on a squared norm of each row of a pseudo-inverse of the sub-matrix.

8. A radio frequency communication (RFC) chip for a station, the RFC chip comprising:
   a fixed-complexity sphere decoder (FSD) configured to decode a downlink (DL) multi-user multiple-input multiple-output (MU-MIMO) wireless signal associated with symbols for a plurality of stations,
   wherein the FSD is configured to:
      determine a full search (FS) layer column based on a product of a channel matrix of the station and an estimate of a steering matrix of the station;
      order, based on a comparison associated with magnitudes of columns of an effective channel matrix of the station, the columns of the effective channel matrix of the station;
      generate a modified effective channel matrix by reordering the ordered columns of the effective channel matrix such that a column of the effective channel matrix corresponding to the determined FS layer column is reordered to be an FS layer column of the modified effective channel matrix;
      determine a full rank matrix based on the modified effective channel matrix; and
      determine a symbol of the station based on the full rank matrix.

9. The RFC chip of claim 8, wherein the FSD is further configured to:
   generate the modified effective channel matrix by removing a column of the effective channel matrix.

10. The RFC chip of claim 9, wherein the FSD is further configured to:
    perform an interference whitening based on the removed column.

11. The RFC chip of claim 8, wherein:
    the station corresponds to an i-th station among the plurality of stations; and
    the effective channel matrix $H_i\hat{F}$ of the station corresponds to $\overline{H}_i = H_i\hat{F} = H_i[\hat{F}_1 \ldots \hat{F}_{i-1}\ \hat{F}_i\ \hat{F}_{i+1} \ldots \hat{F}_K]$, where K is a number of the plurality of stations, $H_i$ corresponds to the channel matrix of the i-th station, and $\hat{F}_i$ corresponds to the estimate of the steering matrix of the i-th station.

12. The RFC chip of claim 8, wherein:
    the station corresponds to an i-th station among the plurality of stations;
    the FS layer column is determined by ordering the columns of the product $H_i\hat{F}_i$ based on a determination of an index vector used for a fixed-complexity sphere decoder (FSD) ordering scheme for the product, based on a squared norm of each row of a pseudo-inverse of the product; and
    $H_i$ corresponds to the channel matrix of the i-th station, and $\hat{F}_i$ corresponds to the estimate of the steering matrix of the i-th station.

13. The RFC chip of claim 12, wherein a number of FS layer columns of the product is greater than or equal to $\lceil \sqrt{N_i}-1 \rceil$ and $N_i$ is a number of reception antennas of the i-th station.

14. The RFC chip of claim 8, wherein:
the station corresponds to an i-th station among the plurality of stations;
each of the plurality of stations comprises a plurality of reception antennas; and
the columns of the effective channel matrix of the i-th station are ordered based on a determination of an index vector used for a fixed-complexity sphere decoder (FSD) ordering scheme for the effective channel matrix, based on a squared norm of each row of a pseudo-inverse of the effective channel matrix.

15. The RFC chip of claim 14, wherein a number of FS layer columns of the effective channel matrix is greater than or equal to $\lceil \sqrt{M}-1 \rceil$, and M is a total number of reception antennas of the plurality of stations.

16. The RFC chip of claim 8, wherein reordering of the ordered columns of the effective channel matrix is performed according to an FS layer index set $\bar{u}_{FS}^{\,i}$ of the modified effective channel matrix and an SS layer index set $\bar{u}_{SS}^{\,i}$ of the modified effective channel matrix.

17. The RFC chip of claim 16, wherein:
the FS layer index set $\bar{u}_{FS}^{\,i}$ is an FS layer index set of the modified effective channel matrix $\bar{H}^i$ and is defined as $u_{FS,i}^{\,i} \subseteq \bar{u}_{FS}^{\,i} \cup (u_{FS}^{\,i} \cup u_{FS,i}^{\,i})$, where $u_{FS}^{\,i}$ is an FS layer index set of the ordered columns in $\tilde{H}^i$, $u_{FS,i}^{\,i}$ is an FS layer index set of ordered columns in $\tilde{H}_i$, and $\tilde{H}_i$ is ordered from the product; and
the SS layer index set $\bar{u}_{SS}^{\,i}$ is an SS layer index set of the modified effective channel matrix $\bar{H}^i$.

18. The RFC chip of claim 16, wherein:
the FS layer index set $\bar{u}_{FS}^{\,i}$ is an FS layer index set of the modified effective channel matrix $\bar{H}^i$ and is defined as $\bar{u}_{FS}^{\,i} = u_{FS}^{\,i} \cup u_{FS,i}^{\,i}$, where $u_{FS}^{\,i}$ is an FS layer index set of the ordered columns in $\tilde{H}^i$, $u_{FS,i}^{\,i}$ is an FS layer index set of ordered columns in $\tilde{H}_i$, and $\tilde{H}_i$ is ordered from the product; and
the SS layer index set $\bar{u}_{SS}^{\,i}$ is an SS layer index set of the modified effective channel matrix $\bar{H}^i$.

19. A mobile station comprising:
a display;
a system-on-chip (SoC) comprising a processor configured to process instructions associated with an application program, a system memory configured to store data, and a graphic processing unit (GPU) configured to process graphic data to be displayed on the display of the mobile station;
multiple antennas configured to receive a downlink (DL) multi-user multiple-input multiple-output (MU-MIMO) wireless signal associated with symbols for a plurality of stations; and
a fixed-complexity sphere decoder (FSD) configured to decode the DL MU-MIMO wireless signal,
wherein the FSD is configured to:
determine a full search (FS) layer column based on a product of a channel matrix of the mobile station and an estimate of a steering matrix of the mobile station;
order, based on a comparison associated with magnitudes of columns of an effective channel matrix of the mobile station, the columns of the effective channel matrix of the mobile station;
generate a modified effective channel matrix by reordering the ordered columns of the effective channel matrix such that a column of the effective channel matrix corresponding to the determined FS layer column is reordered to be an FS layer column of the modified effective channel matrix;
determine a full rank matrix based on the modified effective channel matrix; and
determine a symbol of the mobile station based on the full rank matrix.

20. The mobile station of claim 19, wherein the FSD is implemented in the SoC or implemented in a radio frequency communication (RFC) chip configured to communicate with the SoC.

* * * * *